(12) United States Patent
Qian et al.

(10) Patent No.: US 12,440,516 B2
(45) Date of Patent: Oct. 14, 2025

(54) METHOD AND COMPOSITION FOR PROMOTING CELL GROWTH AND TISSUE REPAIR

(71) Applicant: Zhejiang Hygeiancells Biomedical Co. LTD, Jianggan District (CN)

(72) Inventors: Jin Qian, Jianggan District (CN); Jiayi Xu, Jianggan District (CN); Jimin Wang, Jianggan District (CN)

(73) Assignee: Zhejiang Hygeiancells Biomedical Co. LTD, Jianggan District (CN)

( * ) Notice: Subject to any disclaimer, the term of this patent is extended or adjusted under 35 U.S.C. 154(b) by 1145 days.

(21) Appl. No.: 17/267,641

(22) PCT Filed: Aug. 9, 2019

(86) PCT No.: PCT/CN2019/099953
§ 371 (c)(1),
(2) Date: Feb. 10, 2021

(87) PCT Pub. No.: WO2020/030097
PCT Pub. Date: Feb. 13, 2020

(65) Prior Publication Data
US 2021/0205372 A1    Jul. 8, 2021

(30) Foreign Application Priority Data
Aug. 10, 2018    (CN) ......................... 201810909485.4

(51) Int. Cl.
*A61K 35/57*    (2015.01)
*A61P 9/10*    (2006.01)
*A61P 17/02*    (2006.01)

(52) U.S. Cl.
CPC ............... *A61K 35/57* (2013.01); *A61P 9/10* (2018.01); *A61P 17/02* (2018.01)

(58) Field of Classification Search
None
See application file for complete search history.

(56) References Cited

U.S. PATENT DOCUMENTS 3,870,598 A * 3/1975 Alexeeva ............... A61K 39/12
435/235.1
4,211,843 A * 7/1980 Dubreuil ................ A61K 39/12
424/212.1
7,192,759 B1 * 3/2007 Pau ....................... A61K 39/12
435/235.1
7,527,961 B2 * 5/2009 Pau ....................... A61K 39/12
435/235.1
2013/0045278 A1    2/2013 Qian
2014/0093582 A1    4/2014 Qian

FOREIGN PATENT DOCUMENTS

WO    2016111726 A1    7/2016

OTHER PUBLICATIONS

Nov. 13, 2019 (WO) International Search Report—Appl No. PCT/CN2019/099953.
Levinson et al. "Fetal Rat Amniotic Fluid: Transforming Growth Factor? and Fibroblast Collagen Lattice Contraction" Journal of Surgical Research, vol. 100, No. 2, Aug. 21, 2001, pp. 205-210.
Calvert et al. "Extracts of Rat Amniotic Fluid Contain a Potent Inducer of Intestinal Crypt Formation" The Anatomical Record, vol. 205, Dec. 31, 1983, pp. 27-37.
Wu, Guioqing (Growth Factor) Biochemistry, Zhejiang Science and Technology Publishing House, Jul. 31, 2004, pp. 152 and 153.
Sep. 23, 2021 (EP) Supplementary European Search Report, Application No. 19848242.
Feizi et al. "Effect of amniotic fluid on the in vitro culture of human corneal endothelial cells" Experimental Eye Research 122 (2014) 132-140.
Farjah et al. "The effect of chick embryo amniotic fluid on sciatic nerve regeneration of rats" IJVR, 2015, vol. 16, No. 2, Ser. No. 51, pp. 167-171.
Ahmad et al "Therapeutic values of chick early amniotic fluid (ceAF) that facilitates wound healing via potentiating a SASP-mediated transient senescence" Genes & Diseases, Mar. 1, 2021.
Beretti et al. "Amniotic fluid stem cell exosomes: Therapeutic perspective: Immunomodulation by AFSC exosomes" Biofactors, vol. 44, No. 2Mar. 1, 2018.
Blakewood et al. "The use of chick embryo amniotic fluid for the in vitro culture of early-stage mammalian embryos" Theriogenology 39: 189, 1993.
Zhou et al. "Biochemistry", Version 1, Jul. 2004, pp. 152-153.
Ma et al. Modern Diagnosis and Treatment of Diabetes, Sep. 2007, first edition, pp. 17-18.
Wang et al. Human Pathophysiology, 2st edition, Aug. 2002, pp. 775-776.
Shen et al., Research progress on the therapeutic effect of hepatocyte growth factor in the cardiovascular system, Frontier and Clinical Practice of Cardiovascular Disease, 1st edition, Sep. 2007, p. 920.

\* cited by examiner

*Primary Examiner* — Blaine Lankford
(74) *Attorney, Agent, or Firm* — Banner & Witcoff, Ltd.

(57) ABSTRACT

A method and composition for promoting cell growth and tissue repair, relating a use of amniotic fluid from non-human animals, especially birds and non-human mammals, and/or an extract thereof. The composition may be a cell culture medium containing the amniotic fluid and/or the extract thereof, or may be a pharmaceutical composition.

18 Claims, 10 Drawing Sheets

METHOD AND COMPOSITION FOR PROMOTING CELL GROWTH AND TISSUE REPAIR

RELATED APPLICATIONS

This application is a National Stage Application under 35 U.S.C. 371 of co-pending PCT application number PCT/CN2019/099953 designating the United States and filed Aug. 9, 2019; which claims the benefit of CN application No. 201810909485.4 and filed Aug. 10, 2018 each of which are hereby incorporated by reference in their entireties.

TECHNICAL FIELD OF THE INVENTION

The present invention relates to the methods and compositions for promoting cell growth and tissue repair.

BACKGROUND TECHNIQUE OF THE INVENTION

Due to the limitations of traditional therapies and aging population, the demand for new treatment of tissue repair has increased. Currently, tissue and organ defects are usually treated with cell-based therapies. These therapies involve introducing precursor cells, preferably stem cells, into the defect site to expand the endogenous cell population and increase the rate of tissue regeneration and repair. The cells are essentially autologous, which are isolated from the patient in need of treatment and are amplified in vitro before introducing back to the patient's defect site.

However, there are some issues with existing treatments. First of all, there will be mutations in cells with long-term culture in vitro. Unlike in vivo, these mutations cannot be identified and distinguished from the culture system at present. Therefore, the longer the culture time, the more tumor cells will be. Cells grown for long periods in vitro also have a risk of differentiation, which reduces their ability to proliferate and repair tissue in vivo. Second, cell culture in vitro will cause exposure to foreign substances which may contain contaminating particles (such as viruses and bacteria) or chemicals. If not detected prior to implantation, these contaminants have the potential to cause significant illness and morbidity. In addition, the risk of cells becoming toxic increases as time of cell culture increases.

Therefore, new methods and compositions for tissue repair are still in high demand in this field, which can directly promote the growth of cells in humans or animals to achieve tissue repair.

SUMMARY OF THE INVENTION

The present invention provides a cell culture method which includes the steps of the cell culture in vitro using a cell medium containing non-human animal amniotic fluid and/or its extract, wherein, the amniotic fluid is derived from chicken eggs at the embryo age of 5-12 days, preferably chicken eggs at the embryo age of 6-11 days, more preferably chicken eggs at the embryo age of 7-9 days, the most preferably chicken eggs at the embryo age of 7-8 days; or from eggs of avian other than chicken whose developmental stage corresponds to the developmental stage of the embryonic-age chicken eggs; or from embryos of rodents at the gestational age of 8-20 days, preferably 8-14 days; or from embryos of non-human mammals other than rodents whose developmental stage corresponds to that of rodents at the gestational age of 8-20 days, preferably 8-14 days. This method can promote the growth of cells.

The invention also provides a cell culture medium containing amniotic fluid of non-human animals and/or its extract; wherein, the amniotic fluid is derived from chicken eggs at the embryo age of 5-12 days, preferably chicken eggs at the embryo age of 6-11 days, more preferably chicken eggs at the embryo age of 7-9 days, the most preferably chicken eggs at the embryo age of 7-8 days; or from eggs of avian other than chicken whose developmental stage corresponds to the developmental stage of the embryonic-age chicken eggs; or from embryos of rodents at the gestational age of 8-20 days, preferably 8-14 days; or from embryos of non-human mammals other than rodents whose developmental stage corresponds to that of rodents at the gestational age of 8-20 days.

The present invention also provides the application of amniotic fluid and/or its extract in preparation of promoting growth of animal cells and/or reagents in tissue repair, wherein, the amniotic fluid is derived from chicken eggs at the embryo age of 5-12 days, preferably chicken eggs at the embryo age of 6-11 days, more preferably chicken eggs at the embryo age of 7-9 days, the most preferably chicken eggs at the embryo age of 7-8 days; or from eggs of avian other than chicken whose developmental stage corresponds to the developmental stage of the embryonic-age chicken eggs; or from embryos of rodents at the gestational age of 8-20 days, preferably 8-14 days; or from embryos of non-human mammals other than rodents whose developmental stage corresponds to that of rodents at the gestational age of 8-20 days.

The present invention also provides the application of amniotic fluid and/or its extract in the preparation of medicament of illness associated with tissue damage, wherein, the amniotic fluid is derived from chicken eggs at the embryo age of 5-12 days, preferably chicken eggs at the embryo age of 6-11 days, more preferably chicken eggs at the embryo age of 7-9 days, the most preferably chicken eggs at the embryo age of 7-8 days; or from eggs of avian other than chicken whose developmental stage corresponds to the developmental stage of the embryonic-age chicken eggs; or from embryos of rodents at the gestational age of 8-20 days, preferably 8-14 days; or from embryos of non-human mammals other than rodents whose developmental stage corresponds to that of rodents at the gestational age of 8-20 days, preferably 8-14 days.

In one or more embodiments, the extract does not bind with the ion exchange column between pH5.8 and 8.0 and the molecular weight of the components contained in it is in the range of 500-1200 Daltons.

In one or more embodiments, the stated tissues are from any one or more of the tissues, including: cartilage, meniscus, ligament, tendon tissue, intervertebral disc tissue, periodontal tissue, skin tissue, vascular tissue, muscle tissue, fascia tissue, mucoperiosteal tissue, eye tissue, pericardial tissue, lung tissue, synovial tissue, nerve tissue, kidney tissue, bone marrow, urogenital tissue, intestinal tissue, liver tissue, pancreas tissue, spleen tissue, and adipose tissue; the stated animal cells are from any one or more of the tissues. In some embodiments, the stated cells are heart cells, such as a cardiomyocyte.

In one or more embodiments, the conditions related to tissue damage include but are not limited to conditions caused by disease or trauma or tissue abnormal development, selected from: hernia; Pelvic floor defect; laceration or fracture of tendon or ligament; Skin wounds, such as scars, traumatic wounds, ischemic wounds, diabetic wounds, severe burns, skin ulcers such as bedsores or pressure-induced ulcers, venous and diabetic ulcers, surgical wounds associated with the removal of skin cancer; vascular diseases, such as peripheral artery disease, abdominal aortic aneurysm, carotid artery disease and venous disease, vascular defects, vascular dysplasia; muscle diseases such as congenital myopathy, myasthenia gravis, inflammatory, neurological and myogenic muscle diseases, muscular dystrophy, such as Duchenne muscular dystrophy, Becker muscular dystrophy, myotonic dystrophy, limb girdle muscular atrophy, facioscapulohumeral muscular dystrophy, congenital muscular dystrophy, ophthalmopharyngeal muscular atrophy, distal muscular dystrophy, Emery-Dreifuss muscular dystrophy; senile diseases such as Alzheimer's disease and senile joint degeneration.

The present invention also provides the application of amniotic fluid and/or its extract in the preparation of medicament of promoting wound healing; wherein, the amniotic fluid is derived from chicken eggs at the embryo age of 5-12 days, preferably chicken eggs at the embryo age of 6-11 days, more preferably chicken eggs at the embryo age of 7-9 days, the most preferably chicken eggs at the embryo age of 7-8 days; or from eggs of avian other than chicken whose developmental stage corresponds to the developmental stage of the embryonic-age chicken eggs; or from embryos of rodents at the gestational age of 8-20 days, preferably 8-14 days; or from embryos of non-human mammals other than rodents whose developmental stage corresponds to that of rodents at the gestational age of 8-20 days, preferably 8-14 days.

In one or more embodiments, the extract does not bind with the ion exchange column between pH5.8 and 8.0 and the molecular weight of the components contained in it is in the range of 500-1200 Daltons.

DETAILED APPROACHES

Figures 1, 2:
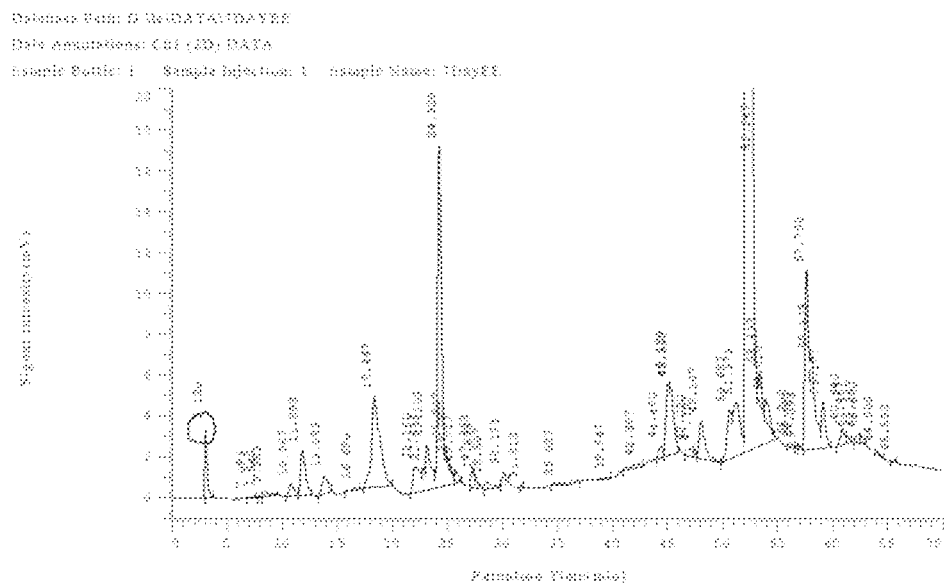
FIG. 1: HPLC detection results of amniotic fluid from chicken eggs at the embryo age of 7 days.
FIG. 2: HPLC detection results of amniotic fluid from chicken eggs at the embryo age of 11 days.

It should be understood that, within the scope of the present invention, the above-mentioned technical features of the present invention and the technical features specifically described in the following (such as the embodiments) can be combined with each other to form a preferred technical solution.

The present inventor discovered that the group of growth factors contained in the non-human animal amniotic fluid and/or its extract can promote cell growth or migration, including but not limited to promoting regeneration of cardiac cells such as cardiomyocytes after myocardial infarction. Therefore, this invention relates to the use of the amniotic fluid and/or its extract to promote cell growth and tissue repair.

The amniotic fluid can come from avian eggs and non-human mammals. Avian eggs refer to poultry eggs. The preferred avian is poultry, such as chickens, ducks and geese. Preferably, the present invention uses avian eggs that are 5-20 days old, preferably 6-15 days old. It should be understood that for different eggs, the appropriate embryo age may not be the same. For example, when using chicken eggs, it is preferable to use chicken eggs at the embryo age of 5-12 days, more preferably chicken eggs at the embryo age of 6-11 days, more preferably chicken eggs at the embryo age of 7-9 days, the most preferably chicken eggs at the embryo age of 7-8 days. When using eggs of other avian, eggs whose developmental stage corresponds to the developmental stage of the embryonic-age eggs mentioned above can be used. For example, when duck eggs are used, the embryo age of 8-10 days, especially 8-9 days may be the best.

Conventional methods can be used to obtain amniotic fluid from avian eggs. For example, the blunt end of an egg of the corresponding embryo age can be knocked to break the egg shell, and the egg shell can be peeled to form a hole with a diameter of about 2 cm. Then carefully tear off the shell membrane and vitelline membrane by using tweezers, making sure not to damage the amniotic membrane. Pour the amniotic membrane covered by embryo and the connected tissues from the shell into a culture dish, and use the injection syringe to pierce the amniotic membrane to extract the amniotic fluid until the amniotic membrane clings on to the embryo, thereby obtaining the amniotic fluid used in the present invention.

In this invention, amniotic fluid can also be derived from non-human mammals, especially rodents such as from mice. Other non-human mammals can be common domestic animals such as cattle, sheep, dogs, cats, pigs, etc. In some embodiments, the amniotic fluid is derived from rodent embryos with a gestational age of 8-20 days, preferably 8-14 days or 11-16 days, more preferably 13-14 days, or from its developmental period and gestational age, 8-20 days, preferably 8-14 days or 11-16 days, more preferably 13-14 days rodent embryos corresponding to the developmental stage of non-human mammals. Amniotic fluid can be obtained by conventional methods. For example, use surgical scissors to cut the abdominal cavity of a mouse that is 8-20 days pregnant, preferably 8-14 days or 11-16 days, more preferably 13-14 days, carefully remove and cut open the uterus, and pierce the amniotic membrane with a syringe to extract the amniotic fluid. Until the amniotic membrane is close to the embryo, the amniotic fluid used in the present invention can be obtained.

It should be understood that if necessary, the amniotic fluid can be centrifuged to separate possible impurities such as egg yolk in order to obtain pure amniotic fluid as much as possible. The supernatant obtained after centrifugation is the amniotic fluid used in the present invention. It should be understood that all steps of obtaining amniotic fluid need to be carried out under sterile conditions; in addition, "amniotic fluid" as used herein shall refer to "pure" amniotic fluid, that is, the amniotic fluid isolated from avian eggs or embryos of non-human mammals does not contain other components within and is not contaminated by foreign substances. Pure amniotic fluid can be stored in a refrigerator below −60° C. and can be used after defrosting.

In some embodiments, the present invention uses the extract of the amniotic fluid. Preferably, the extract does not bind with the ion exchange column at pH 5.8-8.0, and the molecular weight of the components contained in it is in the range of 500-1200 Daltons. The neutral fraction with a molecular weight of 500-1200 Daltons can be separated from the amniotic fluid, thereby obtaining the extract. Gel filtration columns and ion exchange columns are two common methods for this invention. For example, one can use method of gel chromatography column (a variety of gel chromatography columns as mentioned below) to separate a fraction with a molecular weight of 500-1200 Daltons from the amniotic fluid, then use ion exchange (the ion exchange column as mentioned below) to separate the neutral fraction from the fraction. Alternatively, one can use ion exchange (the ion exchange column as mentioned below) to separate the neutral fraction from the fraction, then use gel filtration chromatography column (a varieties of gel filtration chromatography columns as mentioned below) to separate a fraction with a molecular weight of 500-1200 Daltons from the amniotic fluid.

In some embodiments, one can obtain a neutral fraction with a molecular weight of 500-2000 Daltons by separating the amniotic fluid in advance, and then obtain a fraction with a molecular weight of 500-1200 Daltons therefrom. Specifically, the method may include the following steps:

(1) Obtain the neutral fraction with a molecular weight of 500-2000 Daltons by separating the amniotic fluid; and (2) Obtain the neutral fraction with a molecular weight of 500-2000 Daltons by separating neutral fraction with a molecular weight of 500-1200 Daltons.

Step (1) can be achieved by methods of gel filtration and ion exchange chromatography. The components in amniotic fluid with a molecular weight of 500-2000 Daltons can be separated by gel filtration chromatography, and uncharged (neutral) fraction can be obtained by ion exchange chromatography.

Herein, gel filtration chromatography can be used by purchasing various gel filtration chromatography columns on the market, such gel filtration chromatography columns include but not limited to GE's Sephacryl S-100, Sephacryl S-200, Sephacryl S-300, Sephacryl S-400, Superose 12, Superose 6, Superdex 12, Superdex 6, etc., It should be understood that any other packing materials with a separation range of 500-10000 Daltons can also be used for gel filtration chromatography. Generally, when using a gel filtration chromatography column, one needs to balance the gel filtration chromatography column with ddH$_2$O, and the flow rate can be determined according to actual conditions. For example, in some embodiments, the flow rate could be 0.5-50 ml/min, such as 1 ml/min. Usually, the ultraviolet absorption is between 200-300 nm, such as 280 nm. After UV absorption curve becomes stable and returns to the baseline, the balance is ended, and the sample can be injected. The flow rate of the sample is determined according to the actual preparation. After the injection, the crudes can be eluted by degassed ddH$_2$O, and the fraction with molecular weight of 500-2000 Daltons can be collected. If necessary, one can repeat separation of gel filtration chromatography for several times, and mix the fraction appears in the same peak during each separation.

In this invention, the separation of charged compounds and uncharged compounds can be achieved by common methods, such as ion exchange. Both anion exchange and cation exchange can be used as methods in this invention. In some embodiments, anion exchange is used herein. Some common anion exchange columns can be used, including but not limited to GE's DEAE Sepharose, ANX Sepharose, Q Sepharose, Capto DEAE, Capto Q, Mono Q, Mini Q, etc., It should be understood that other brands of anion exchange packing materials can also be used. Alternatively, some common cation exchange columns can also be used, including but not limited to CM Sepharose, SP Sepharose, Capto S, Mono S, Mini S, etc., Generally, when performing ion exchange, one should balance the ion exchange column with a buffer. The buffer can be a common buffer in the realm, such as a phosphate buffer, especially a sodium phosphate buffer. The pH of the buffer can be determined according to the ion exchange column used. For example, when an anion exchange column is used, a pH 7.5 to 8.5 buffer, preferably pH 7.5 to 8.0 buffer can be added to balance the anion exchange column; when a cation exchange column is used, a pH 5.8 to 7.0 buffer, preferably pH 5.8 to 6.5 can be used for balance Cation exchange column. In some embodiments, the sodium phosphate buffer contains Na$_2$HPO$_4$ and NaH$_2$PO$_4$ and has a pH of around 5.8 or 8.0. The present invention preferably uses an anion exchange column for separation. The flow rate can be determined according to the actual situation. For example, in some embodiments, the flow rate can be 0.5-50 ml/min, such as 1 ml/min. Generally, after the 280 nm UV absorption curve becomes stable and returns to the baseline, the balance is ended. Then inject the sample and collect the excurrent flows (that is, the part that is not bound to the column). The sample flow rate is determined according to the actual preparation.

In step (1), gel filtration chromatography can be performed first to separate the fraction with a molecular weight of 500-2000 Daltons, and then ion exchange can be performed to separate the neutral fraction; alternatively, ion exchange can be performed first to separate the neutral fraction from amniotic fluid, and then gel chromatography is used to separate the active ingredients of the neutral fraction with a molecular weight of 500-2000 Daltons to obtain a neutral fraction with a molecular weight of 500-2000 Daltons.

The main purpose of step (2) is to further separate the neutral fraction obtained in step (1) to acquire active ingredients with a molecular weight of 500-1200 Daltons. Herein, common gel filtration chromatography columns on the market can be used to separate fraction with a molecular weight of 500-1200 Daltons. Applicable gel chromatography columns include, but are not limited to, HiLoad Superdex 16/600 Superdex75 pg, Superdex Peptide, Superdex 200, Superdex 30, etc. from GE. It should be understood that other brands of gel filtration chromatography packing materials with a separation range of 500-10000 Daltons can also be used.

Usually, one can use ddH$_2$O to balance gel column, in which the flow rate is determined according to the actual situation. For example, in some embodiments, the flow rate can be 0.5-50 ml/min, such as 1 ml/min. Generally, after the 280 nm UV absorption curve becomes stable and returns to the baseline, the balance is ended, and the sample can be injected. The flow rate of the sample is determined according to the actual preparation. After the injection, the crudes can be eluted by degased ddH$_2$O, then the fraction with molecular weight of 500-2000 Daltons can be collected, which is exactly the extract stated in the invention.

The extract obtained by the above method is formulated into pH 5.8-8.0 solution and passes through a variety of ion exchange columns (including DEAE Sepharose, Q Sepharose, Mono Q, CM Sepharose, SP Sepharose, and Mono S), in which the contained compounds do not integrate with these ion exchange columns.

The amniotic fluid and/or its extract can be used for cell culture in vitro. Specifically, the stated amniotic fluid and/or its extract can be used to culture a variety of cells from a variety of tissue sources in a variety of animals. For example, the amniotic fluid can be added to a suitable cell medium for the culture of the cells of interest. An appropriate cell medium can be chosen according to the cells to be cultured, and an appropriate amount of amniotic fluid and/or its extract of the present invention can be added to the cell medium. Sample cell media includes but are not limited to cell media on the market such as DMEM, RPMI 1640, MEM, DMEM/F12, etc. For instance, the amount of amniotic fluid and/or its extract to be added can be 0.1-30% (e.g. 1-25% or 3-20%) of the weight of the cell medium.

Alternatively, the stated amniotic fluid and/or its extract can be used as active ingredients of medicament that is administered to the targeted subject in vivo to promote cell growth and tissue repair. For example, one can administer the effective amount of the stated amniotic fluid and/or its extract to the targeted subject, or the pharmaceutical composition that contains the stated amniotic fluid and/or its extract.

In this invention, animals can be mammals, especially humans.

In this invention, the word "repair" refers to the formation of new tissue sufficient to fill at least part of an invalid or structurally discontinuous tissue defect. "Tissue defect" or "tissue defect site" means damage of epithelial, connective or muscular tissue. Tissue defect leads to functioning of the tissue at an undesirable level or under undesirable conditions. For example, a tissue defect can be laceration of partial layer or complete layer of tendon, or a local cell death caused by a heart attack. Tissue defect can form a "void", which can be understood as a three-dimensional defect, such as a tear, cavity, hole, or other substantial destruction in the complete structure of epithelial, connective, or muscular tissue. In some embodiments, tissue defect means tissues that are incapable of endogenous or spontaneous repair. Tissue defect can be caused by accident, disease, and/or surgical operation. For example, cartilage defect can be caused by joint trauma, such as the movement of torn meniscus tissue into the joint. Tissue defect can also be triggered by degenerative diseases such as osteoarthritis. In some embodiments, the present invention particularly relates to the repair of cartilage.

The tissues stated in this invention include but are not limited to muscle tissue, epithelial tissue, connective tissue, and nervous tissue. In some embodiments, the stated tissues in this invention include but not limited to: cartilage, meniscus, ligament, tendon tissue, intervertebral disc tissue and periodontal tissue, skin, blood vessels, muscle and fascia, periosteum, eye tissue, pericardium, lung tissue and synovial tissue and nerve tissue, kidney, bone marrow, urogenital, intestinal tissue, liver, pancreas, spleen tissue and adipose tissue. Therefore, the cells stated in this invention can be cells from any of the tissues mentioned above.

In this case, cells can be either autologous or allogeneic. In the preferred embodiment, the cells are autologous, which means they are separated from the animal itself that needs tissue repair or treatment, especially separated from tissue itself that needs repair or treatment. Therefore, one can use the stated amniotic fluid and/or its extract in vitro or to cultivate autologous cells in a culture medium that contains the stated amniotic fluid and/or its extract in vitro, or to cultivated autologous cells by the method as stated in this invention, forming up implantable tissue or matrix and implanting to the animal's body, especially to human's body, especially the tissue defect site to repair the damaged tissue. These cells amplify endogenous cell population, and increase the rate of tissue regeneration and tissue repair. In some embodiments, the present invention illustrates the direct administration of the stated amniotic fluid and/or its extract directly to the damaged site in order to promote the proliferation of normal cells, achieving tissue repair of the defect site.

In some embodiments, one can treat condition related to tissue damage by using the stated amniotic fluid and/or its extract, including but not limited to conditions of failure of proper development caused by diseases or injury, such as a hernia, pelvic floor defect, laceration or fracture of tendon or ligament, skin wounds (such as scar), traumatic injury, ischemic wound, diabetes, severe burns, skin ulcers (such as pressure ulcers, venous ulcers, and diabetic ulcers), as well as the surgical wounds (such as skin removal related to skin cancer); vascular conditions (such as peripheral artery disease, abdominal aortic aneurysm, carotid artery disease and venous disease; vascular defects, vascular dysplasia); muscle diseases (such as congenital myopathy); Myasthenia gravis; inflammatory, neurogenic, or myogenic muscle diseases; as well as muscular dystrophy (such as Duchenne muscular dystrophy, Becker muscular dystrophy, myotonic dystrophy, limb girdle muscular atrophy, facioscapulohumeral muscular dystrophy, congenital muscular dystrophy, ophthalmopharyngeal muscular atrophy, distal muscular dystrophy, Emery-Dreifuss muscular dystrophy); senile diseases such as Alzheimer's disease and senile joint degeneration Therefore, the present invention provides the application of the stated amniotic fluid and/or its extract in the preparation of reagents or medicament that promote cell growth and/or tissue repair; and the application in the preparation of medicament for the treatment of diseases related to tissue damage. The invention also provides a method of tissue repair, including using the stated amniotic fluid and/or its extract or cultivating tissue cells of interests in vitro in a culture medium using the stated amniotic fluid and/or its extract, after forming up tissue matrix, implant the tissue matrix to the site of injury or tissue defect. The invention also provides a method of the treatment of a tissue injury-related condition, which includes the procedure of administering the stated amniotic fluid and/or its extract or the pharmaceutical composition containing the stated amniotic fluid and/or its extract, the therapeutically effective amount can be determined according to specific condition.

The stated amniotic fluid and/or its extract can be directly used for the methods or uses described herein, and administered to a subject in need. The mode of administration can be parenteral, intravenous injection or intracardiac injection. In some embodiments, a therapeutically effective amount of the amniotic fluid and/or its extract can be mixed with an appropriate amount of normal saline for injection, water for injection or glucose for injection, and then the compound can be administered by a suitable method, such as intravenous injection, intracardiac injection or the focal zone administration.

The dosage and frequency of the injection is determined by the medical staff according to the patient's age, gender, condition, etc., Generally, for the treatment of a particular disease, therapeutically effective amount refers to dose that is sufficient to improve or in some way alleviate the symptoms associated with the disease. Such dose can be administered as a single dose, or can be administered according to an effective treatment option. The treatment may cure a disease, but it often improves the symptoms of a disease. Generally, repeated injection of doses is required to achieve the desired symptom improvement. For example, the dose for humans is usually 1-200 ml/each time, and the patient can be injected daily or weekly. In some embodiments, the frequency of injection can be every two days, every three days, every four days, every five days, every six days, every half month, or once a month.

The invention also provides a pharmaceutical composition, which comprises the stated amniotic fluid and/or its extract, especially the amniotic fluid and/or its extract from avian eggs, and more preferably at the embryo age of 5-12 days, more preferably 6-11 days, more preferably 6-9 days, the most preferably 7-8 days. In some embodiments, the stated amniotic fluid and/or its extract is the amniotic fluid and/or its extract from rodents that are pregnant for 8-20 days, preferably 8-14 days or preferably 11-16 days, more preferably 13-14 days. The pharmaceutical composition can be the cryopreserved amniotic fluid and/or its extract or its lyophilized reagent, such as the freeze-dried amniotic fluid and/or its extract at a temperature below −60° C. The pharmaceutical composition can also contain other pharmaceutically acceptable carriers or excipients, such as physiological saline for injection, water for injection, or glucose injection.

In some embodiments, the present invention also provides a cell culture medium containing an appropriate amount of the stated amniotic fluid and/or its extract. The amount of amniotic fluid and/or its extract in a cell culture medium can be determined according to the type of cells being cultured. For example, the amount of the amniotic fluid or its extract can be 0.1-30%, such as 1-25% or 3-20% of the weight of the cell culture medium, or, while the amniotic fluid is being used, the amount (volume ratio) of the amniotic fluid or its extract added to the cell culture medium can be 1-30%, such as 5-20%, of a basal cell culture medium. A suitable basal cell culture medium can be chosen according to cells to be cultured. Exemplary cell culture media include but are not limited to cell culture media sold on the market such as DMEM, RPMI 1640, MEM, DMEM/F12, and so on.

Hereinafter, the present invention will be explained in the form of specific embodiments. It should be understood that these examples are just illustrative and are not intended to limit the scope of the present invention. Unless otherwise specified, the methods, reagents, and instruments used in the examples are conventional methods, reagents, and instruments in the realm.

Example 1

1. Materials
a) Instruments and Tools
Microcomputer full-automatic incubator (CP Group™ ZF880), clean culture dish, 1.0 ml syringe (Jiangxi Hongda™), 70% alcohol-sterilized forceps, stainless steel sieve, sterile centrifuge tube (Axygen® #SCT-50ML-25-S) and low-speed refrigerated centrifuge (Zhongjia KDC-2046).

b) Reagents and Biological Materials

Eggs at the embryo age of 7-day.

2. Experimental Protocols

Take out an egg, tap the flat blunt end that is placed upright to break the eggshell, then gently pull apart the eggshell to form a hole about 2 cm in diameter, and the edge should be as smooth as possible. Use tweezers to carefully tear off the shell membrane and vitelline membrane, making sure not to damage the amniotic membrane. Observe the development of embryos, and only embryos that are well developed and meet the standards of the corresponding stage can be used to extract the amniotic fluid.

Pour the amniotic membrane and connected tissues covering the embryo from the shell into a culture dish, and pierce the amniotic membrane with a syringe to extract the amniotic fluid, the bevel of the needle should face away from the embryo until the amniotic membrane clings to the embryo, and then pour the clear, colorless, and dust-free amniotic fluid into the centrifuge tube in the ice box.

Use tweezers to take out the embryos in the amniotic membrane, collect them in a stainless steel sieve placed on ice, homogenize the collected embryos with a blender every hour, pack and seal them in a sterile plastic storage tank, then tilt and place in the refrigerator at −80° C., and can place vertically after freezing.

The amniotic fluid extract is tested and collected by the Mapada™ 1800 UV Spectrophotometer, the standard operating procedure of the spectrophotometer can be referred to the manual. The qualified amniotic fluid extract can be pooled for mixing and balancing.

Balance the centrifuge tube that collects the amniotic fluid extract and use Zhongjia™ KDC-2046 low-speed refrigerated centrifuge to centrifuge at 5° C. for 21 min and 3500 rpm (see the manual for the standard operating procedure of the centrifuge). Decant the supernatant to a clean plastic storage tank, and store it in a refrigerator at −80° C. Reserve 5 ml samples for subsequent testing in each batch.

All steps are performed under sterile conditions.

Example 2

In this case, a Hitachi Primaide high performance liquid chromatograph (HPLC) is used to exam the components of amniotic fluid from chicken eggs at different embryonic ages. Perform the examination according to the operating instructions of the chromatograph. Wash with 100% acetonitrile for 30 minutes before the examination, set flow rate 0.8 ml/min, and then balance with water for 30 minutes, set flow rate 0.8 ml/min. Draw 25 μl samples and eliminate air bubbles, click "data acquisition" button of the Chromatograph's own software, select "method 2", click "single analysis start" at the bottom of the screen. When the system displays "waiting for injection", rapidly inject samples, then switch valve after the injection is over. The method 2 is as follows:

| Time (min) | Water (%) | Acetonitrile (%) | Flow rate (ml/min) |
|---|---|---|---|
| 0.0 | 100.0 | 0.0 | 0.8 |
| 11.0 | 100.0 | 0.0 | 0.8 |
| 17.0 | 95.0 | 5.0 | 0.8 |
| 30.0 | 90.0 | 10.0 | 0.8 |
| 45.0 | 55.0 | 45.0 | 0.8 |

-continued

| Time (min) | Water (%) | Acetonitrile (%) | Flow rate (ml/min) |
|---|---|---|---|
| 60.0 | 0.0 | 100.0 | 0.8 |
| 70.0 | 0.0 | 100.0 | 0.8 |

Figure 3:
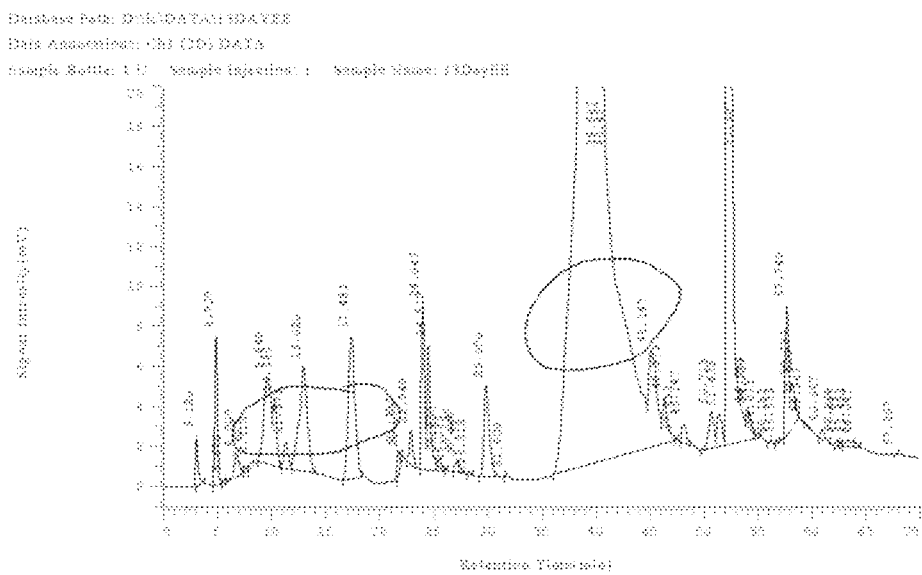
FIG. 3: HPLC detection result of amniotic fluid from chicken eggs at the embryo age of 13 days.

The present embodiment examined amniotic fluid with the gestational age of 7 days, 11 days and 13 days, the results are shown in FIG. 1-3.

Example 3

DPPH is 1,1-DIPHENYL-2-PICRYLHYDRAZYL and its structure is as follows:

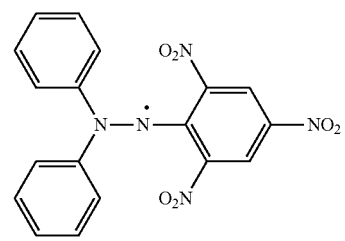 [SMILES: O=[N+]([O-])c1cc([N+](=O)[O-])c(NN(c2ccccc2)c2ccccc2)c([N+](=O)[O-])c1]

In the molecule of DPPH, there are many electron-withdrawing-$NO_2$ and large $\pi$ bonds of the benzene ring, so nitroxide free radicals can exist stably.

When DPPH radicals are eliminated, the absorption spectrum A value, where the most absorbing wavelength 519 nm is, will decrease accordingly. Such a stable free radical DPPH provides an ideal and simple pharmacological model for the examination of free radical scavenging activity. This example uses DPPH to examine the anti-radical of chicken embryo amniotic fluid.

Obtain 0.8 mg DPPH and dissolve it in 20 ml solvent methanol, sonicate it for 5 minutes and shake it well to make the upper and lower parts uniform to obtain DPPH solution. Take 1 ml DPPH solution, measure the $A_0$ value at 519 nm, A=0.5-0.7. Store the DPPH solution away from the sunlight and use it up within 3.5 hours.

The amniotic fluid of chicken embryos at the embryo ages of 6, 7, 8, 9, 10, and 11 days are obtain from Example one, and store in a refrigerator at 4° C. for later use after centrifugation.

Use vitamin C as a positive control to measure the standard curve. Add different volumes of 0.04 mg/ml Vc sample to 0.6 ml DPPH, add absolute ethanol up to 1 ml and mix up, adjust to zero according to methanol as control, measure light absorption value under 519 nm wavelength. Plot after repeating the data three times.

Pour 400 μl amniotic fluid from different embryonic ages into the test tube, add 600 μl formulated DPPH methanol solution, mix up, let it react for 10 min until bubbles no longer occur (mix well before the examination), adjust to zero according to methanol as control, and measure light absorbance under 519 nm wavelength.

The sampling information of each group is shown in the following table:

| Experimental Group | Sample Solution | 95% Ethanol (or Anhydrous Ethanol) | DPPH Test Liquid | Total Volume |
|---|---|---|---|---|
| Blank group | 0 ml | 0.4 ml | 0.6 ml | 1 ml |
| Vc | n μl | (400-n)μl | 0.6 ml | 1 ml |
| Sample Group | 0.4 ml | 0 ml | 0.6 ml | 1 ml |

Use the following formulation to calculate clearance rate (inhibition rate):

Clearance Rate (%)=$(A_0-A)/A_0 \times 100\%$.

Figure 4:
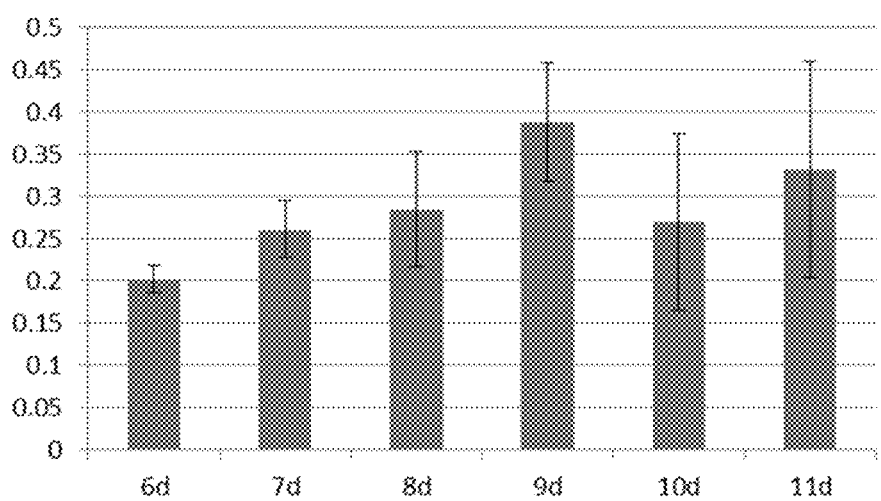
FIG. 4: Free radical of amniotic fluid from chicken eggs at different embryo ages, where the horizontal axis indicates embryo age, and the vertical axis indicates clearance rate.

The result is shown in FIG. 4.

Example 4

This example examines example 1, which is the effect of the chicken egg amniotic fluid (EE) on the growth of chicken embryonic fibroblasts under different culture conditions. The composition of the DMEM medium used in this example is as follows: Gibco® #Cat. 11960077, add 1% L-glutamine (Solarbio® #G0200) and 5% FBS (Gibco® #Cat.10099141), 0.25% Trypsin (Hangzhou Keyi Bio™ #CY003), PBS (BI™ #02-024-1ACS), 0.4% Trypan Blue Stain (BBI™ #72-57-1).
1. Acquisition and Culture of Chicken Embryo Fibroblasts Obtain embryos from chicken eggs at the embryo age of 7 days, rinse the surface of the embryos with PBS, and suck up the liquid with a pipette. Take out the internal organs of the embryo and cut the remaining tissues until there are no large particles or clumps visible to the naked eye. Add 1 ml of 0.25% Trypsin, mix it with the tissue with the pipette tip, and transfer the suspension to a 15 ml centrifuge tube. Wash the petri dish with 1 ml of 0.25% Trypsin, and transfer the suspension to the same 15 ml centrifuge tube. Put the centrifuge tube in a 37° C. water bath, after 5-7 minutes of digestion, add 8 ml DMEM medium (containing FBS) to neutralize the Trypsin. Put the centrifuge tube into the centrifuge and centrifuge for 5-10 seconds. Take out the centrifuge tube and collect the supernatant. Centrifuge the centrifuged supernatant at 2000 rpm for 2 minutes. Discard the supernatant, add 4 ml of DMEM medium, and resuspend the cells with a pipette tip. Pipette 1 ml cell suspension into 10 cm cell culture dish respectively, and add 10 ml DMEM medium, Shake the culture dish in the cross direction for at least 20 times in each direction to make the cells evenly distributed. Incubate 5% $CO_2$ at 37° C. When the cells cover 70%-90% of the bottom of the culture dish, pass the cells down.

Take the culture dish out of the incubator, collect the original culture medium in a centrifuge tube. Carefully add 5 ml PBS to wash the cells. Then add 500 μl, 0.25% Trypsin, put culture dish to the incubator, digest for 1 minute. Gently tap the side of the culture dish to speed up the digestion process. When the cell clumps are quickly broken down and most of the cells are floating, quickly add 9.5 ml of the recycled original medium to neutralize the Trypsin. Use a pipette to blow the bottom of the culture dish, collect as much cell suspension as possible into a 15 ml centrifuge tube, and centrifuge at 2000 rpm for 3 minutes. Discard the supernatant, add 4 ml DMEM medium, and resuspend the cells with a pipette tip. Pipette 1 ml cell suspension to 10 cm cell culture dish that contains fresh cell culture of 10 ml amniotic fluid of different volume ratios. Shake the petri dish in the cross direction for at least 20 times in each direction to make the cells evenly distributed. Incubate 5% $CO_2$ at 37° C.

Pick well-grown chicken embryo fibroblasts, collect the original culture medium in a centrifuge tube. Carefully add 5 ml PBS to wash the cells and make sure not to damage the cell layer. Shake gently and pour out the PBS. Add 100 μl of 0.25% Trypsin to digest for 2-5 minutes (24-well-plate), neutralize with 100 μl culture medium, and use the pipette tip to make a single cell suspension. Dilute the single cell suspension according to certain ratio, add an equal amount of 0.4% trypan blue staining solution to stain. The appropriate dilution ratio is where there are 20-200 cells after dilution. Draw the appropriate amount of cell suspension (15 μl), load from the top and bottom edge of the cover slips into the blood count board, and count the number of living cells under a microscope. Count the total number of living cells and adjust the cell concentration to $1\times10^5$ cells/ml. Draw each sample every 24 hours, and 3-wells/time point, proceed regular Trypsin digestion, prepare single cell suspension, and count under microscope. Draw a growth curve, which set time (day) as the horizontal axis and cell concentration as the vertical axis. Number of cells=total cell count/$4\times10^4\times$ dilution factor, cell concentration=number of the cells/ml.

Figure 5:
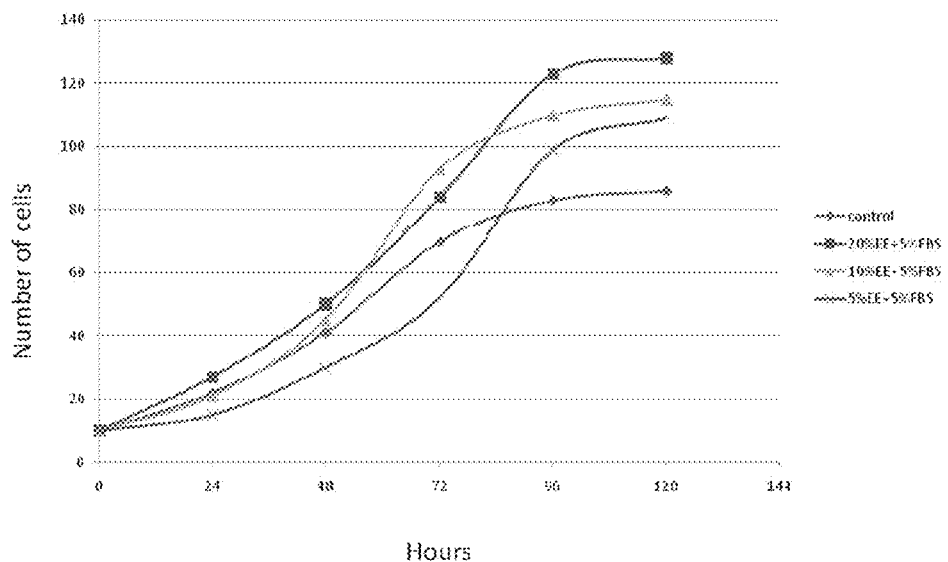
FIG. 5: Growth curves of chicken embryonic fibroblasts under different culture conditions. The amniotic fluid from chicken eggs can promote cell growth.

The result is shown in FIG. 5, which illustrates that after 96 hours of co-incubation, the number of chicken embryo fibroblasts in the experimental group added with EE is significantly higher than the number of chicken embryo fibroblasts in the control group without EE.

Example 5

The amniotic fluid of duck eggs at the embryo age of 8 days is obtained using the same method as in Example 1. The scratch test is used to test the effect of amniotic fluid from chicken eggs on growth viability and migration ability of chicken embryo fibroblasts and the effect of amniotic fluid from duck eggs on growth viability and migration ability of human umbilical vein endothelial cells (HUVEC). The amniotic fluid from duck eggs comes from duck eggs at the embryo age of 8 days, and is obtained using the method of Example 1. Chicken embryo fibroblasts are obtained using the same method as in Example 4, and human umbilical vein endothelial cells are obtained from the market.

The composition of the DMEM medium used in this case is as follows: Gibco® #Cat. 11960077, add 1% L-glutamine (Solarbio® #G0200) and 5% FBS (Gibco® #Cat.10099141), 0.25% Trypsin (Hangzhou Keyi Bio™ #CY003), PBS (BI™ #02-024-1ACS), 0.4% Trypan Blue Staining (BBI™ #72-57-1).

On the first day before the experiment, prepare a 6-well-plate. Use a marker and a ruler to draw 5-6 evenly distributed horizontal lines on the back of the plate, and cross the holes; then draw a vertical line at the center to indicate the location of the scratch. Add about $5\times10^5$ cells that are in the logarithmic growth phase. In principle, the fusion rate will reach 90% after overnight inoculation.

On the day of the experiment, draw a line along the vertical line of the marker pen perpendicular to the bottom surface of the 6-well-plate with the pipette tip in reference to the ruler. Try not to incline, curve, and preferably use a single pipette tip on different wells with a preferred width of 1000-2000 μm. Wash each well 3 times with 2 ml PBS to erase the cells at the scratches. Add 2 ml EE culture medium of different contents to each well, routinely culture, and change the medium every 48 hours. Set time as 0h from the scratch, take photos at fixed position every 24 hours, and measure the cell spacing on both sides of the scratch. Observe the cell growth in each well; draw a chart, which set time (days) as the horizontal axis and the distance of the scratches in each hole as the vertical axis; calculate the healing speed of the scratches in each well.

Figure 6:
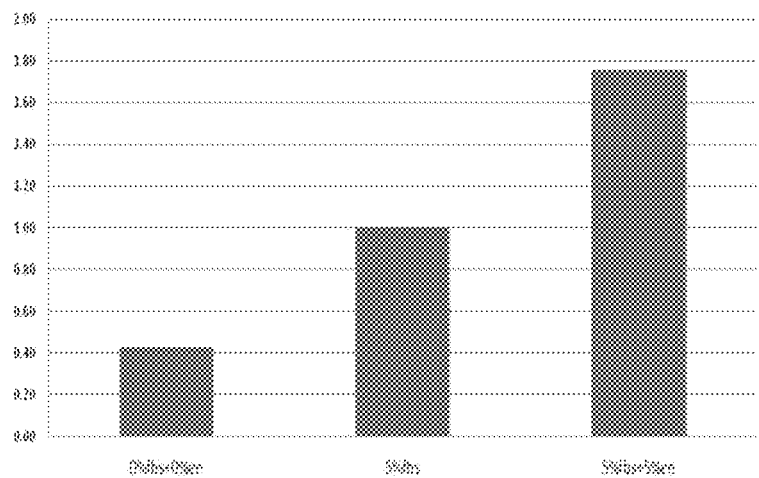
FIG. 6: The effect of amniotic fluid from chicken eggs on the growth vitality and migration ability of human umbilical vein endothelial cells (HUVEC), where the horizontal axis represents the culture medium, and the vertical axis represents the OD450 value.
Figure 7:
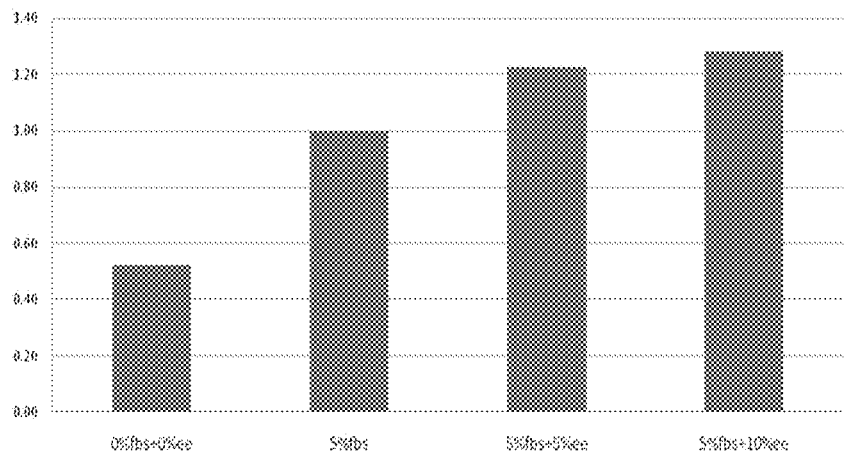
FIG. 7: The effect of amniotic fluid from duck eggs on the growth viability and migration ability of chicken embryonic fibroblasts, where the horizontal axis represents the culture medium, and the vertical axis represents the OD450 value.

The results are shown in FIG. 6 and FIG. 7. FIG. 7 shows the effect of amniotic fluid from chicken eggs on the growth viability and migration ability of human umbilical vein endothelial cells (HUVEC). The addition of 5% (volume ratio) amniotic fluid obviously shows the promotion of the healing of HUVEC. FIG. 7 shows the effect of amniotic fluid from duck eggs on the growth viability and migration ability of chicken embryonic fibroblasts. The addition of amniotic fluid also obviously shows the promotion on the healing of chicken embryonic fibroblasts.

Example 6

Obtain the chicken egg amniotic fluid (EE) at the embryo age of 7 days for the experiment.

Perform separation from an adult mouse to obtain osteoblast, culture to the third generation (P3) in DMEM medium added with 10% FBS in a 5% $CO_2$ incubator at 37° C. Seed 400 cells each well in a 96-well-plate. After 24 hours, replace to DMEM culture medium only (starvation), culture for 24 hours, and then replace to the following culture medium (the amount of EE is measured by volume of DMEM), continue to culture for 72 hours, and then examine cell growth by CCK-8 kit:
1) DMEM (no serum);
2) DMEM+2.5% EE;
3) DMEM+5% EE;
4) DMEM+7.5% EE;
5) DMEM+10% EE.

Figure 8:
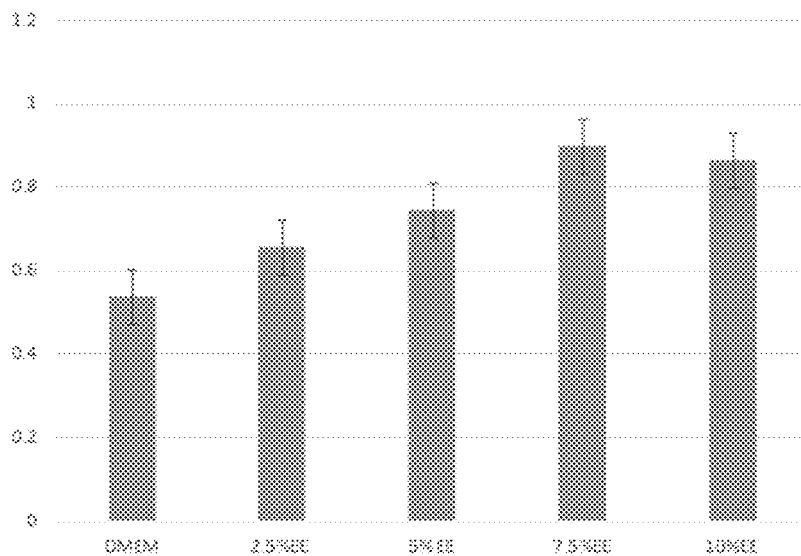
FIG. 8: Amniotic fluid from chicken eggs promotes the growth of mouse osteoblast, where the horizontal axis represents the medium, and the vertical axis represents the OD450 value.

The result is shown in FIG. 8, which demonstrates that chicken embryo amniotic fluid can significantly promote the growth of osteoblast of mouse.

Example 7

1. Isolate Primary Cardiomyocytes (VM)

Wash the heart ventricle of the suckling mouse in pre-cooling PBS, then cut the heart tissue into pieces in DMEM/F12. Shake in a 37° C. water bath and digest with 0.04% collagenase II+0.08% Trypsin. Filter and centrifuge the digested cells with a sieve at 1000 r/min for 10 minutes. Add 15% FBS cell culture medium to spread the plate and culture in a 5% $CO_2$ saturated humidity incubator 37° C.

2. Cell Viability Test

After digesting the primary cardiomyocytes, spread to 96-well-plate, 6000 cells/well, five replicate wells in each group. After 24 hours in 5% $CO_2$ saturated humidity incubator at 37° C., respectively use medium DMEM/F12, DMEM/F12 that contains 10% FBS, DMEM/F12 that contains 10% FBS and 5% EE (the amniotic fluid obtained from Example 1, volume ratio) to replace the original medium DMEM/F12 that contains 15% FBS. After 48 hours of incubation, add 10 μl CCK-8 reagent to each well. After incubating for 2 hours, the absorbance is measured at 450 nm by an ELISA reader.

Figure 9:
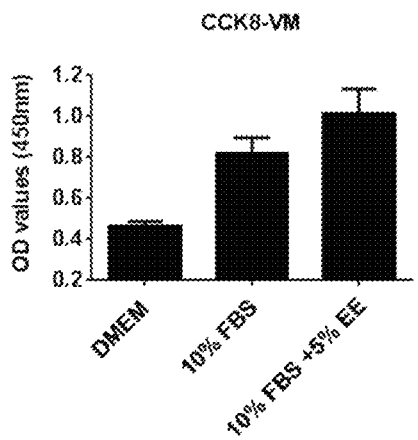
FIG. 9: Amniotic fluid from eggs promotes the growth of primary cardiomyocytes. Where the horizontal axis represents the medium, and the vertical axis represents the OD450 value.

The result is shown in FIG. 9.

Example 8

The purpose of this embodiment is to gradually purify the biologically active compounds in the chicken embryo amniotic fluid through the gel chromatography column Sephacryl S-200, ion exchange column HiPrep Q, desalting column HiPrep 26/10 Desalting and HiLoad 16/600 Superdex 75 pg.

1. Material
   1.1 Purified sample: fresh 7-day embryo amniotic fluid, 50 ml;
   1.2 Main experimental equipment and consumables;
   1) GE AKTA Purifier;
   2) GE Sephacryl S-200 gel filtration columns;
   3) GEHiPrep Q ion exchange columns;
   4) GEHiPrep 26/10 Desalting desalting columns;
   5) GEHiLoad 16/600 Superdex 75 pg gel filtration columns;
   6) Superloop 10 ml.

2. Method
   2.1 Solution Preparation
   Preparation of sodium phosphate buffer A (50 mM $Na_2HPO_4$+$NaHPO_4$, pH 8.0): mix 46.6 ml 1 mol/l $Na_2HPO_4$ with 3.4 ml 1 mol/l $NaH_2PO_4$, add dd$H_2O$ until volume reaches 1 l.
   2.2 Experimental Method
   2.2.2 Sample processing: prepare 50 ml of fresh amniotic fluid, add appropriate amount of hexane, and centrifuge the mix at 2500 rpm, 4° C. for 20 min to obtain the water phase, then filter it with a 0.22 μm membrane filter.
   2.2.3 Sample purification
   Step 1: GE Sephacryl S-200 Gel Column
   Balance gel column with dd$H_2O$: set the low rate to 2 ml/mi, until the 280 nm UV absorption curve stabilizes and returns to baseline;
   Sample loading: set the flow rate to 1 ml/min, load 10 ml sample;
   Elution: elute the crude product by degasser dd$H_2O$ to at a flow rate of 2 ml/min, collect fraction equally with 3 ml per tube, then elude with 2 column volume (240 ml);
   Repeat the separation and purification 5 times, each time fully mix the proportion with the same peak time;
   Step 2: GE HiPrep Q Ion Exchange Column
   Balance the ion exchange column with sodium phosphate buffer A (50 mM $Na_2HPO_4$+$NaH_2PO_4$, pH 8.0): set the flow rate to 2 ml/min until the 280 nm UV absorption curve becomes stable and returns to the baseline;
   Sample loading: take the biologically active part after the purification of step 1, upload the sample with the pump, flow rate of 1.5 ml/min, loading volume of 250 ml, collect the unbound part of the ion column equally with 2 ml per tube;
   Desalting: displace separately the bound and unbound fraction in the ion column with GE HiPrep 26/10 Desalting into degasser dd$H_2O$, and collect the desalted proportion;
   Step 3: GE HiLoad 16/600 Superdex 75 pg Gel Column
   Balancing the gel column with dd$H_2O$: set the flow rate to 1 ml/min, until the 280 nm UV absorption curve becomes stable and returns to the baseline;
   Sample loading: flow rate of 1 ml/min, load 10 ml sample;
   Elution: elute the sample with degasser dd$H_2O$ at 1 ml/min, collect fraction equally with 2 ml per tube, then elude with 1.5 column volume (240 ml);
   Cell Viability Examination: After digesting the well-grown AC16, spread it to a 96 well plate, 8000 cells/well, 5 replicate wells for each group. Incubate at 5% $CO_2$ with saturated humidity at 37° C. in the incubator for 2 hours, adhere the cells. After 24 hours of starved culture with medium DMEM, replace to 10% FBS DMEM, DMEM and 20% (volume ratio) fraction added medium. After 24 hours of incubation, add 10 μl of CCK-8 reagent to each well. After 2-hour-incubation, measure absorbance at 450 nm by an ELISA reader.

3. Experimental Results

Figure 10:
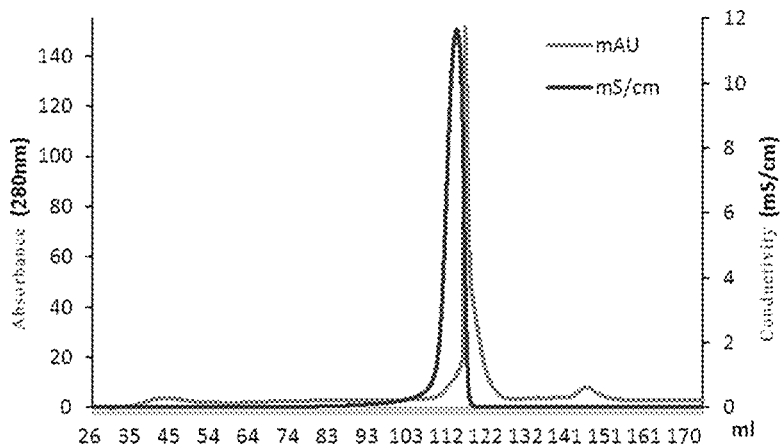
FIG. 10: Chromatogram of GE HiLoad 16/600 Superdex75 pg gel column.
Figure 11:
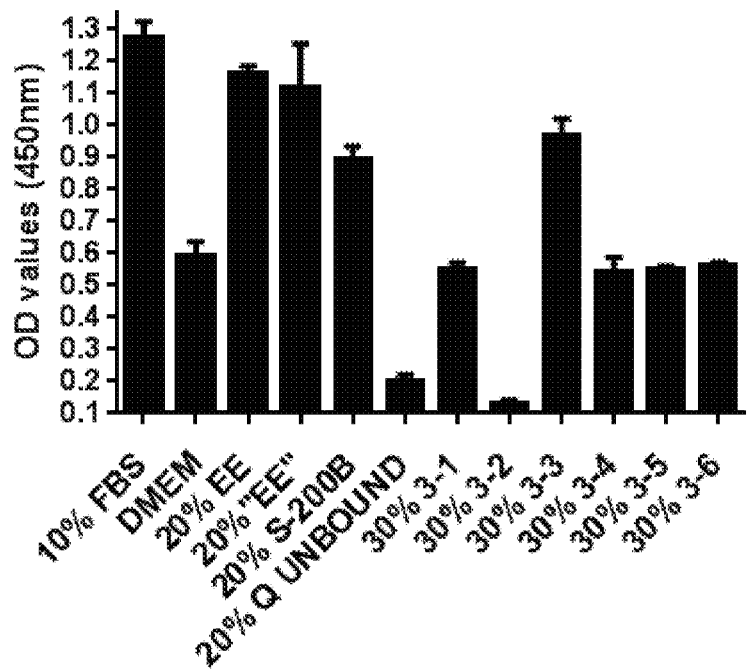
FIG. 11: Isolated fraction of GE HiLoad 16/600 Superdex75 pg gel column for cell viability detection, where the horizontal axis represents the culture medium, where FBS represents fetal bovine serum; DMEM is Dulbecco's Modified Eagle Medium; EE represents amniotic fluid; "EE" represents freeze-dried amniotic fluid; S-200B represents the fraction of peak B; Q UNBOUND represents the unbound fraction of anion column; 3-1 to 3-6 respectively represent the middle volume fraction 1-6 in the third step purification.

The chromatogram of the unbound part separated by the GE HiLoad 16/600 Superdex75 pg is shown in FIG. 10. The cell viability test tracks the biologically active growth factor groups, and the result is shown in FIG. 11.

Example 9

From the same method of example 8 to perform the following separation and purification:

1. Separation and Purification of Active Ingredients

Step 1: GE Sephacryl S-200 Gel Column
  ddH$_2$O balance gel column: flow rate of 2 ml/min until 280 nm UV absorption curve becomes stable and returns to baseline;
  Sample loading: flow rate 1 ml/min, sample loading volume 10 ml;
  Elution: Elute the crude product by degasser ddH$_2$O at a flow rate of 2 ml/min, and collect fraction with a molecular weight in the range of 500-2000 Daltons;
  Repeat separation and purification 5 times, fully pool the fraction of the same peak time every time;

Step 2: Cation Exchange Column GE HiPrep SP
  Sodium phosphate buffer A (50 mM Na$_2$HPO$_4$+ NaH$_2$PO$_4$, pH 5.8) balance the cation exchange column at a flow rate of 2 ml/min until the 280 nm UV absorption curve becomes stable and returns to the baseline;
  Sample loading: obtain the fraction with a molecular weight in the range of 500-2000 Daltons from the first step, use a pump to load at flow rate of 1.5 ml/min, sample volume of 250 ml, and collect the unbound part of the cation exchange column;

Step 3: Gel Column GE HiLoad 16/600 Superdex75 pg
  ddH$_2$O balance gel column: flow rate of 1 ml/min until the 280 nm UV absorption curve becomes stable and returns to the baseline;
  Sample loading: take the unbound part obtained in the second step and load the sample with a flow rate of 1 ml/min and a sample volume of 10 ml;
  Elution: Elute the sample by degasser ddH$_2$O at a flow rate of 1 ml/min, and collect fraction with a molecular weight in the range of 500-1200 Daltons.

2. Active Ingredient Examination

Figure 12:
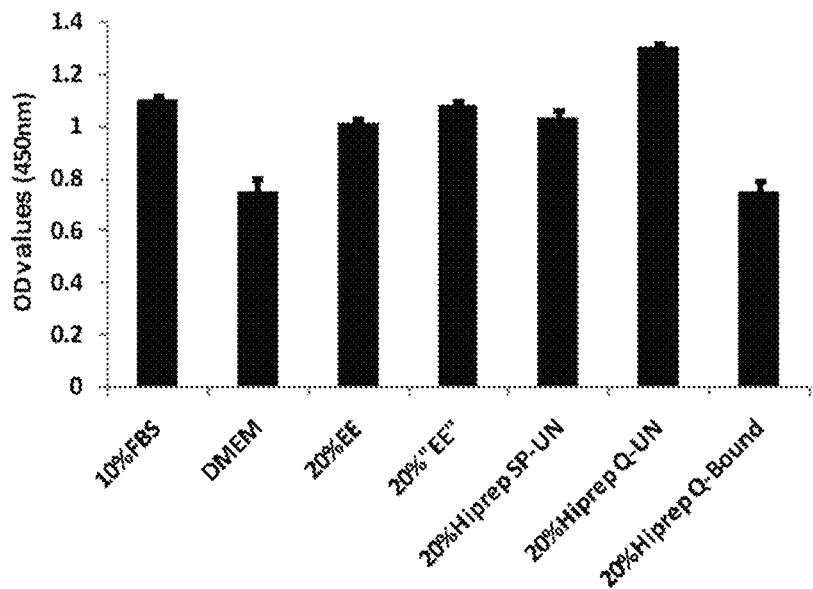
FIG. 12: Cell viability detection cation exchange column GE HiPrep SP and anion exchange column HiPrep Q separation of unbound fraction, where the horizontal axis represents the culture medium, where FBS represents fetal bovine serum; DMEM is Dulbecco's Modified Eagle Medium; EE represents amniotic fluid; "EE" represents freeze-dried amniotic fluid; Hiprep SP-UN represents the fraction that is not bound to Hiprep SP column; Hiprep Q-UN It means the fraction that is not bound to Hiprep Q column; Hiprep Q-Bound means the fraction that is bound to Hiprep Q column.

After digesting the well-grown AC16, spread it to a 96 well plate, 8000 cells/well, 5 replicate wells for each group. Incubate at 5% CO$_2$ with saturated humidity at 37° C. in the incubator for 2 hours, adhere the cells. After 24 hours of starved culture with medium DMEM, replace to 10% FBS DMEM, DMEM and 20% (volume ratio) fraction added medium. After 24 hours of incubation, add 10 μl of CCK-8 reagent to each well. After 2-hour-incubation, measure absorbance at 450 nm by an ELISA reader. FIG. 12 shows the cell viability of the unbound fraction of the cation exchange column GE HiPrep SP.

Example 10

From the same method of Example 8 to perform the following separation and purification:

1. Separation and Purification of Active Ingredients

Step 1: Ion exchange column, HiPrep Q anion exchange column can be used to make pH of each solution 5.8 and 8.0, respectively, then load the sample to exchange the ion, respectively, the flow rate is 2 ml/min until the 280 nm UV absorption curve becomes stable and returns to the baseline;
  Sampling: obtain the amniotic fluid, upload the sample with the pump, flow rate of 1.5 ml/min, sample loading volume 50 ml. Collect the unbound fractions of the ion column.

Step 2: Gel Column GE Sephacryl S-200
  ddH$_2$O balance gel column: flow rate of 2 ml/min until the 280 nm UV absorption curve becomes stable and returns to the baseline;
  Sample Loading: the sample is the unbound fraction from the first step, flow rate of 1 ml/min, sample loading volume 10 ml;
  Elution: Elute the sample by degasser ddH$_2$O at a flow rate of 2 ml/min, and collect fraction with a molecular weight in the range of 500-1200 Daltons.

Step 3: GeHiload 16/600 SuperDex75PG gel column
  DDH2O balanced gel column: the flow rate was 1 ml/min until the UV absorption curve at 280 nm was stable and returned to the baseline;
  Sample loading: upload the fraction in the range of 500-1200 Daltons obtained from the second step with a flow rate of 1 ml/min and a sample volume of 10 ml;
  Elution: Elute the sample by degasser ddH$_2$O at a flow rate of 1 ml/min, and collect fraction with a molecular weight in the range of 500-1200 Daltons.

2. Active Ingredient Examination

After digesting the well-grown AC16, spread it to a 96 well plate, 8000 cells/well, 5 replicate wells for each group. Incubate at 5% CO$_2$ with saturated humidity at 37° C. in the incubator for 2 hours, adhere the cells. After 24 hours of starved culture with medium DMEM, replace to 10% FBS DMEM, DMEM and 20% (volume ratio) fraction added medium. After 24 hours of incubation, add 10 μl of CCK-8 reagent to each well. After 2-hour-incubation, measure absorbance at 450 nm by an ELISA reader. FIG. 12 shows the cell viability of the unbound fraction of the cation exchange column GE HiPrep SP.

Example 11

In this example, a Murine full-thickness wound model is developed to study the wound healing of the stated amniotic fluid and/or its extract in mouse.

1. Material

Anesthetic (5.00% chloral hydrate), 75% alcohol, sterile EE obtained in example 1, PBS, mice (C57BL/6, 8 weeks old).

2. Experimental process (1) Prepare 9 clean cages, weigh 9 adult (6-8 weeks and older) female healthy mice of the same age and put them into the cages.

(2) Prepare chloral hydrate at a concentration of 5.00% and inject it into mice via the abdominal cavity with a 1 ml syringe at a ratio of 0.07 ml/10 g (duration of anesthesia induction is about 5-10 minutes, duration of anesthesia maintenance is about 35 minutes).

(3) When the mice are under anesthesia (after the righting reflex disappears), fix their bodies with mouse anatomic plate, shave the neck and back hair with an electric shaver, and wipe the skin with 75% alcohol for disinfection.

(4) Use an index finger and thumb to pick up the skin on the back of the mouse's neck to form a sufficient area of folds, and place the skin folds on the anatomic plate; the other hand holds a biopsy needle (aperture 6 mm), aiming at the middle of the fold to apply pressure and rotate the skin until both skins sides of the biopsy site is punched to fall.

(5) If there is residual skin, use tweezers and ophthalmological scissors to clean the edge of the dissected cylindrical tissue block, and cut off the full layer of skin along the mark left by the skin biopsy needle to create two identical wounds.

(6) Take photos of the wound with a stereo microscope, measure the wound area, and record the data. The wound should be as parallel to the horizontal line as possible, otherwise the measurement error will be big.

(7) Apply 100 μl of EE or PBS (blank control group) that have passed the quality inspection to the corresponding mouse wound with a pipette, and cover the wound with excipients.

(8) Use medical cotton instead of sawdust in the feeding box, feed separately to prevent mice from scratching the wound. After that, check and measure the wound every 24 hours, take photos and record the data.

(9) Calculate and compare the effects of different excipients on wound healing rate.

3. Experimental Results

Figure 13:
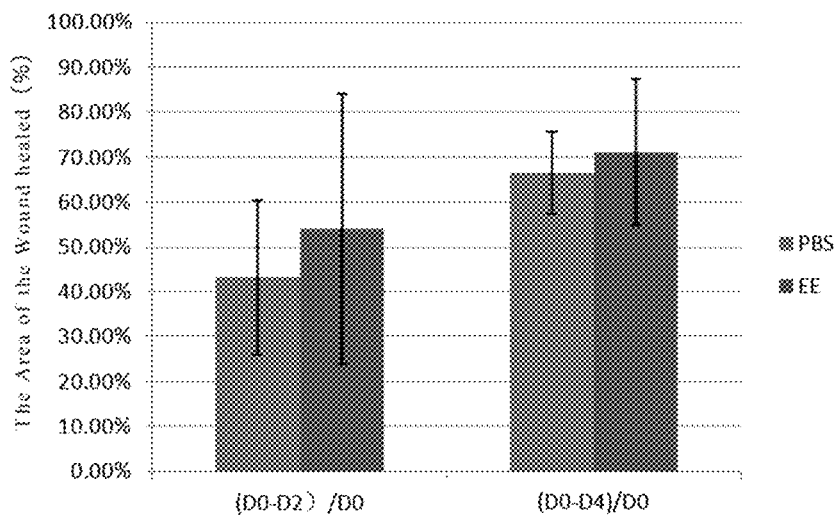
FIG. 13: The amniotic fluid in this invention can significantly promote wound healing. The data demonstrates the area ratio (%) of the wound area on day 0 minus the wound area on day 2 or 4 to the wound area on day 0.

As shown in FIG. 13, the wound area of the mice is measured on the $2^{nd}$ and $4^{th}$ days. The wound area of both groups is reduced. However, the healing rate of the EE group is higher with no scar formed.

Example 12

1. Materials

Commonly used reagents such as sodium hydroxide, sodium chloride, potassium chloride, hydrated sodium hydrogen phosphate, potassium dihydrogen phosphate, sodium bicarbonate, sodium carbonate, magnesium chloride, acetone, concentrated sulfuric acid, concentrated hydrochloric acid, xylene, absolute ethyl alcohol, paraffin and sucrose are purchased from Sinopharm Chemical Reagent Co., China; sodium lauryl sulfate and ethylenediamine tetraacid are purchased from Sigma, USA; Triton X-100 and heparin were purchased from Beijing Dingguo Co., China; Tween-20 is purchased from Thermo Fisher, USA; Chloral hydrate is purchased from Beijing Solebold Technology Co., China; Paraformaldehyde and Masson tricolor dye kit are purchased from Google Biotechnology Co., USA; OCT embedding medium is purchased from Sakura Co., Japan; Antifade Mounting Medium is purchased from Vector, USA.

Rabbit Anti-human/mouse Aurora B antibody is purchased from Sigma Aldrich, USA; Rabbit Anti-Phospho-Histone H3 (Thr3) antibody is purchased from Merck Millipore, German; Rabbit anti-human/mouse cTnT polyclonal antibody is purchased from Abcam, English; Alexa Fluor 594 labeled goat anti-rabbit IgG, Alexa Fluor 488 labeled goat anti-rabbit IgG, Alexa Fluor 594 labeled goat anti-mouse IgG, and Alexa Fluor 488 labeled goat anti-mouse IgG were purchased from Life Technologies, USA; DAPI was purchased from Sigma Aldrich, USA; Goat serum working solution was purchased from Wuhan Boster Biological Engineering Co., Ltd., China.

Trizol is purchased from Invitrogen, USA; Adriamycin hydrochloride was purchased from Shanghai Sangong Biotechnology Co., China.

The animal used in experiment is male mouse C57BL/6J, which is purchased from Shanghai Slack Laboratory Animal Co., China.

Leica Dmi8 fluorescence microscope and Leica IM50 image sampling system is purchased Leica, German; small animal ultrasonograph is purchased from VisualSonics, Canadian.

The preparation of 0.1 mol/l phosphate buffer (1×PBS): NaCl 8.0 g, KCl 0.2 g, $Na_2PO_4 \cdot H_2O$ 3.58 g, $KH_2PO_4$ 0.24 g, adjust pH to 7.4, add deionized water to constant volume of 1000 ml, high-pressure sterilize and store at 4° C.

The preparation of 0.5% Triton X-100:5 ml of original fluid Triton X-100, 1×PBS 995 ml.

2. Experimental Protocols (1) Immunofluorescence (A) Process the cell slide or frozen section according to the experimental requirements, wash with PBS, 5 min×3 times.

(B) In 0.5% Triton X-100 at room temperature for 15 min, washed with PBS, 5 min×3 times.

(C) Block with goat serum at 37° C. for 30 min.

(D) Discard the serum, dilute the primary antibody in appropriate ratio, add dropwise to the covered the tissue, and store humidified box overnight at 4° C.

(E) Take out the humidified box, reheat at 37° C. for 30 min, wash the slides or tissue sections with PBS, 5 min×3 times.

(F) Dilute the secondary antibody in appropriate ratio, add dropwise to the covered tissue, and incubate at 37° C. for 30 min to 60 min.

(G) Wash with PBS 3 times, 5 minutes each time, and DAPI nucleus staining for 10 min.

(H) Wash with PBS 3 times, 5 minutes each time, observe and analyze under a fluorescence microscope after sealing the antifade Mounting Medium.

(2) H&E Dyeing (A) 4 μm slice, fish for a slice at 42° C., bake at 60° C. overnight, store at room temperature.

(B) Dewaxing paraffin sections to water: xylene 3 times, 20 minutes each time; gradient alcohol (100%, 95%, 95%, 90%, 80%) to hydrate respectively for 2 min, 2 min, 2 min, 1 min and 1 min, wash with tap water for 5 min.

(C) Wash with PBS 3 times, 5 minutes each time.

(D) Hematoxylin staining for 5 min.

(E) Rinse with tap water for 10 minutes.

(F) Differentiate twice in 1% hydrochloric acid alcohol, rinse with tap water for 5 minutes.

(G) Use 1% ammonia water to return to blue for 2 minutes, rinse with tap water for 5 minutes.

(H) Eosin staining for 1-5 min.

(I) Use 80%, 90%, 95%, 95%, 100% alcohol for dehydration respectively for 1 min, 2 min, 2 min, 2 min, 2 min.

(J) Verification by dimethylbenzene 3 times, 2 minutes each time.

(K) Use neutral balsam to seal and observe under the microscope.

(3) Masson Trichrome Stain.

(A) Dewax the paraffin sections to water.

(B) Chromizing (conduct potassium dichromate overnight).

(C) Wash with tap water and distilled water in sequence.

(D) Nucleus staining with Harris' hematoxylin stain or Wiegert hematoxylin stain for 1-2 min.

(E) Wash thoroughly, if over-stained, differentiate with hydrochloric acid alcohol for 2-3 S.

(F) Use ammonia to returns to blue for 2 minutes.

(G) Use Masson Fuchun acid fuchsin solution for 5-10 min.

(H) Use 1% phosphomolybdic acid solution to differentiate for 3-5 min.

(I) Stain with 1% aniline blue or light green solution for 5 minutes.

(J) Use 1% glacial acetic acid solution to differentiate for a few seconds.

(K) 95% alcohol, anhydrous alcohol, verification by dimethylbenzene and seal with neutral balsam.

Results: Collagen fibers, mucus, cartilage shown blue (e.g. light green liquid stained green), cytoplasm, muscle, cellulose, glia shown red, nuclei shown black blue.

(4) Establishment of the Mouse Myocardial Infarction Model.

Anesthetize an 8-Week-Old C57BL/6J male mouse with isoflurane in the induction chamber, at a ventilator frequency of 115 times/min of a respiratory ratio of 1:1 and a tidal volume of 1.5 ml. Intubate the trachea through the mouth with 20 g indwelling needle plastic tube, connect to an animal ventilator, conduct continuing anesthesia with 2.5% isoflurane pure oxygen. Conduct skin preparation, 3-4 intercostal thoracotomy, expose the heart, ligate left anterior descending (coronary artery) with 7-0 prolene suture, then the apex of the heart turns white, suture the intercostal space, suture the skin, and disinfect. Turn off the anesthetic and continue to ventilate until the mouse wakes up.

(5) Establishment of Mouse Heart Failure Model

Inject doxorubicin (5 mg/kg) to an 8-week C57BL/6J male mouse once every 7 days. After a total of four injections, the mouse will have heart failure, which is verified by echocardiography.

(6) Draw the Material, Fix and Cut into Slices (A) After the treatment for 1 week and 8 weeks after the operation, execute the mouse by injecting 10% chloral hydrate (200 mg/kg) to its enterocoelia, take out the heart. Also take out liver and kidney for 1 week treatment, embedded by OCT or paraffin.

(B) Frozen sections are used for immunofluorescence=paraffin sections are used for H&E and Masson trichrome staining.

(C) After the specimen is done with Masson trichrome staining, use Image J software to measure the size of myocardial infarction. The calculation formula for the area of myocardial infarction is:

Myocardial Infarction Area=(Length of left ventricular endocardium in myocardial infarction area+ Length of left ventricular epicardium in myocardial infarction area)/(Length of left ventricular endocardium in myocardial infarction area+Length of left ventricular epicardium in myocardial infarction area)*100%

Select 5 sections from each specimen and calculate the average value.

3. Statistical Analysis

All experimental results are expressed in Mean±SEM. "Two-tailed tailed t" test is used for comparison between the two groups, and "one way ANOVA" analysis is used for comparison between multiple groups. P<0.05 is the standard of significant statistical difference. All experimental results are graphed and analyzed using GraphPad Prism 5 (Software, Inc.) and Image J software.

4. Experimental Results (I) Establish a mouse myocardial infarction model according to the method of step (4) above. Divide the established mouse myocardial infarction models into control group (NS) and chicken embryo amniotic fluid (EE) treatment group (6 mice in each group). In the EE treatment group, 100 microliters of the EE prepared in Example One is injected through the tail vein every two days, and a total of 10 injections are made on the 21$^{st}$ day of the third week. The control group is injected with 100 microliters of normal saline 10 times in the same manner.

Figure 14:
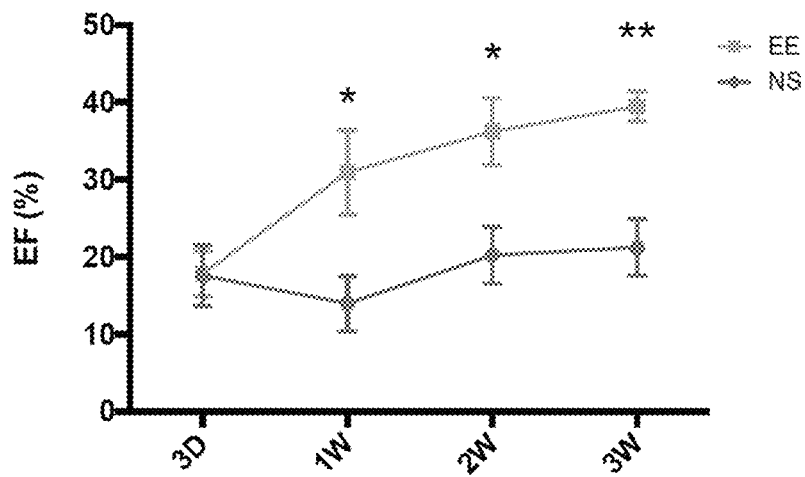
FIG. 14: Ejection fraction (EF) of mice with myocardial infarction. The ejection fraction (EF) and left ventricular shortening fraction (LVSF) of mice can be measured by cardiac ultrasound. It can be seen from the figure that the treatment of amniotic fluid (EE) significantly increased the ejection fraction (EF) of mice with myocardial infarction, and the cardiac function was significantly improved.

Left ventricular ejection fraction (LVEF) is a key classic indicator of left ventricular function. The increase of left ventricular ejection fraction indicates that the cardiac function of mice after myocardial infarction is improved. The ejection fraction of mice is measured by cardiac ultrasound, and the results are shown in FIG. 14. It can be seen from FIG. 14 that by the 3rd week, EE treatment significantly increased the left ventricular ejection fraction of mice with myocardial infarction, indicating that EE treatment significantly improved the cardiac function of mice after myocardial infarction.

Figure 15:
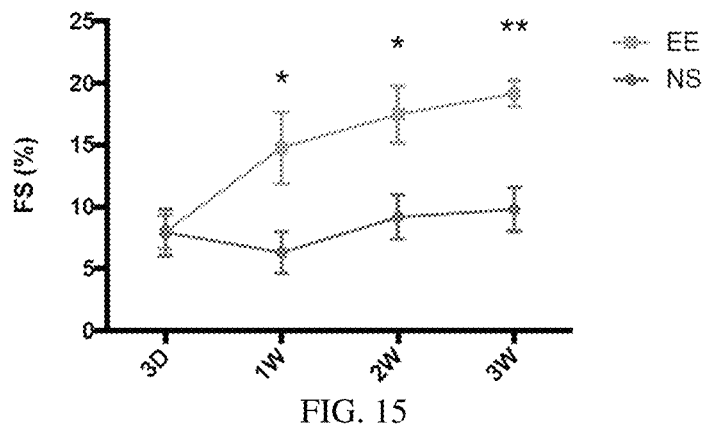
FIG. 15: Left ventricular shortening fraction (LVSF) of mice with myocardial infarction. The ejection fraction and the left ventricular short axis shortening rate of mice can be measured by cardiac ultrasound. It can be seen from the figure that the treatment of amniotic fluid (EE) significantly increased left ventricular shortening fraction (LVSF) of mice with myocardial infarction, and the heart function was significantly improved.

The left ventricular fractional shortening (LVFS) of each group of mice is calculated by cardiac ultrasound data, and the results are shown in FIG. 15. It can be seen from FIG. 15 that by the 3$^{rd}$ week, EE treatment significantly improved the LVSF of mice with myocardial infarction, which also improved the cardiac function of mice after myocardial infarction.

Figure 16:
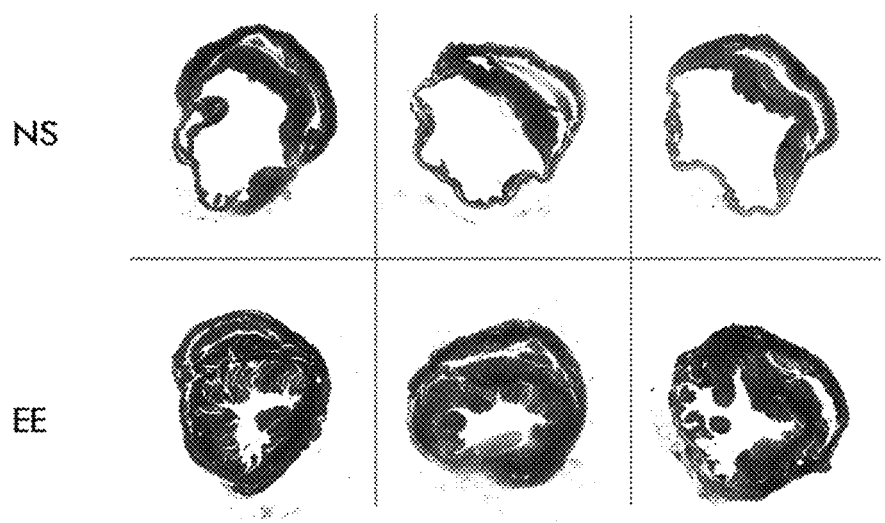
FIG. 16: Masson's trichrome stain of the heart of mice with myocardial infarction. It can be seen from the figure that the mice with myocardial infarction have severe fibrosis, and the left ventricular wall is significantly thinned. After amniotic fluid (EE) treatment, the left ventricular wall thinning is not obvious, and fibrosis is significantly reduced.

Masson staining is a classic method of evaluating and analyzing cardiac infarct tissue and fibrous tissue. Execute the mice in each group after 21 days of treatment, prepare paraffin sections of myocardial tissue, stain according to step (3) above, and the results are shown in FIG. 16. In FIG. 16, the blue part is the fibrosis tissue from infarct, and the red part is the muscle tissue. From the figure, it can be seen that the mice with myocardial infarction have severe fibrosis, and the fibrosis is significantly reduced after EE treatment, which indicates that EE treatment prevents Fibrosis after myocardial infarction of the mice. In addition, the size of the left ventricular cavity is the basis of evaluation of whether there is ventricular dilatation after myocardial infarction, and ventricular dilatation is an important sign of falling cardiac function. It can also be seen from FIG. 16 that the ventricular cavity of the mice with myocardial infarction in the control group are significantly enlarged, in contrast, the left ventricular cavity of the mice in the treatment group aren't significantly enlarged after 3 weeks of EE treatment.

Figure 17:
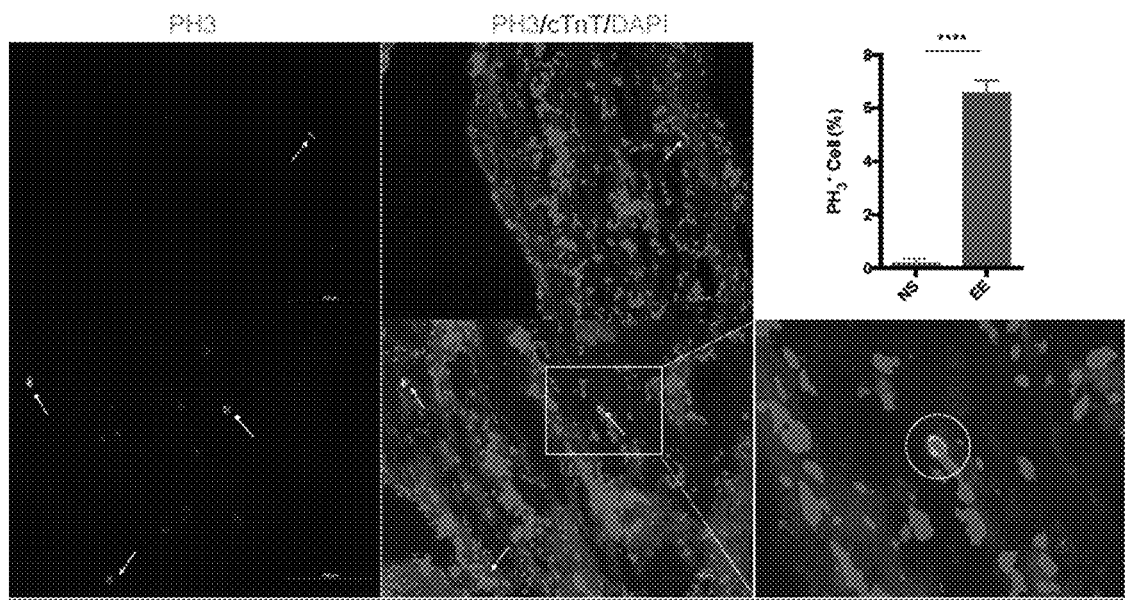
FIG. 17: Immunofluorescence staining (PH3, cTnT, DAPI) of the heart of mice with myocardial infarction.
Figure 18:
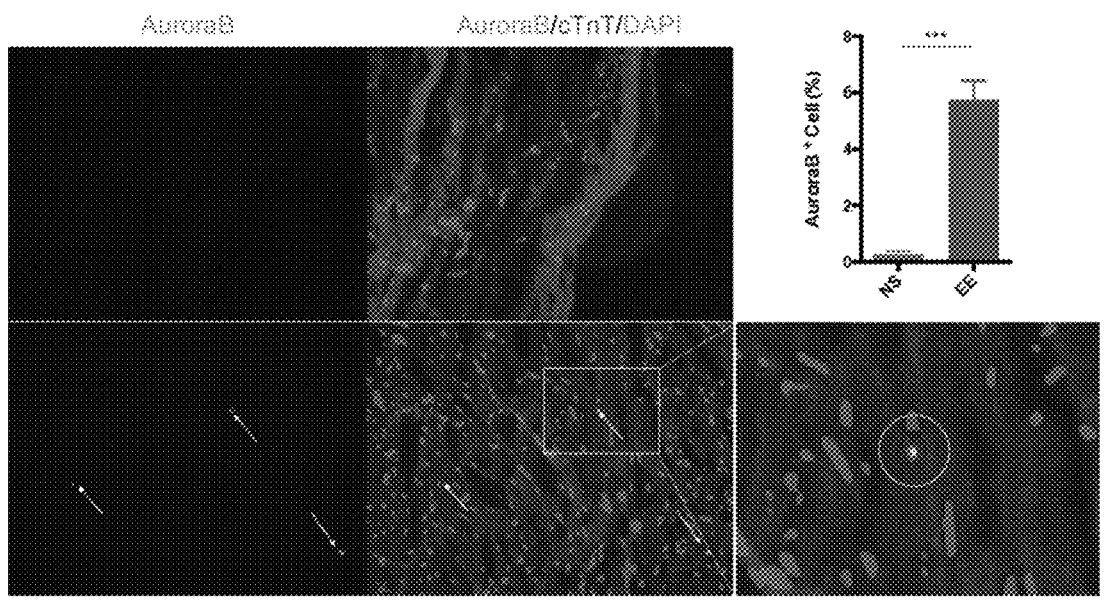
FIG. 18: Immunofluorescence staining (AuroraB, cTnT, DAPI) of the heart of mice with myocardial infarction. It can be seen from the figure that the PH3-positive and AuroraB-positive cells in the hearts of the mice in the treatment group increased significantly, indicating that EE treatment significantly triggered the regeneration of heart cells in mice with myocardial infarction.

PH3 staining is an indicator to judge and evaluate the regeneration of cells in the heart. Execute the mice in each group after 21 days of treatment, prepare frozen sections of myocardial tissue, and conduct PH3 staining according to the method described in step (1) above. The results are shown in FIG. 17. It can be clearly seen from FIG. 17 that the PH3 staining positive (green fluorescent spot, indicated by the arrow) cells in the heart tissue of mice in the EE treatment group increased significantly, indicating that EE treatment promoted the regeneration of cells in the heart tissue. AuroraB staining is an indicator of cell regeneration in the heart. Conduct AuroraB staining according to step (1) above, and results are shown in FIG. 18. It is evident to see from FIG. 18 that Aurora staining positive (green fluorescent spot, indicated by the arrow) cells significantly increased in the cardiac tissue of mice treated by EE, indicating that EE treatment promoted the regeneration of cells in the heart tissue.

(II) Establish a mouse heart failure model according to the method described in step (5) above. Divide the established mouse heart failure models into control group (NS) and chicken embryo amniotic fluid (EE) treatment group (6 mice in each group). In the EE treatment group, 100 microliters of the EE prepared in Experimental Case One is injected through the tail vein every two days, and a total of 10 injections are made on the 21st day of the third week. The control group is injected with 100 microliters of normal saline 10 times in the same manner.

Figure 19:
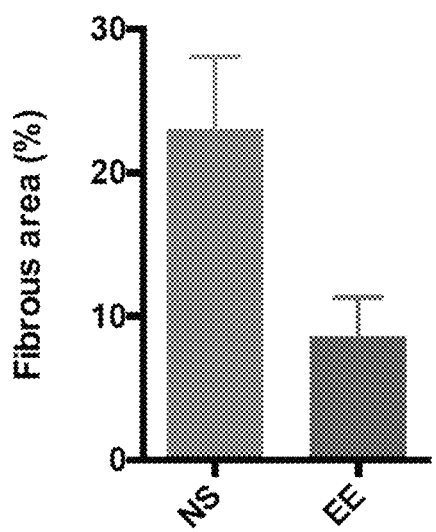
FIG. 19: The area of cardiac fibrosis in mice with myocardial infarction after treatment with amniotic fluid (EE) was significantly smaller than that in normal control group (NS).

Left ventricular ejection fraction (LVEF) is a key classic indicator of left ventricular function. The increase of left ventricular ejection fraction indicates that the cardiac function of mice after heart failure is improved. The ejection fraction of mice is measured by cardiac ultrasound, and the results are shown in FIG. 19. It can be observed from FIG. 19 that by the 3rd week, EE treatment significantly increased the left ventricular ejection fraction of mice with heart failure, indicating that EE treatment significantly improved the cardiac function of mice after heart failure. The area of left ventricular fibrosis significantly decreased.

Example 13

Conduct the surgery of inflatable balloon blockage of an experimental large white pig from Percutaneous Transluminal Coronary Intervention (PCI) to the anterior descending coronary artery, then remove the balloon after 50 minutes, constructing the white swine's cardiac ischemia-reperfusion model. Immediately conduct intravenous injection of chicken's EE (1 ml/kg) obtained from the method described in Example 1 after the surgery. Evaluate basic cardiac function before the surgery. The results are shown in FIGS. 20 and 21.

Figure 20:
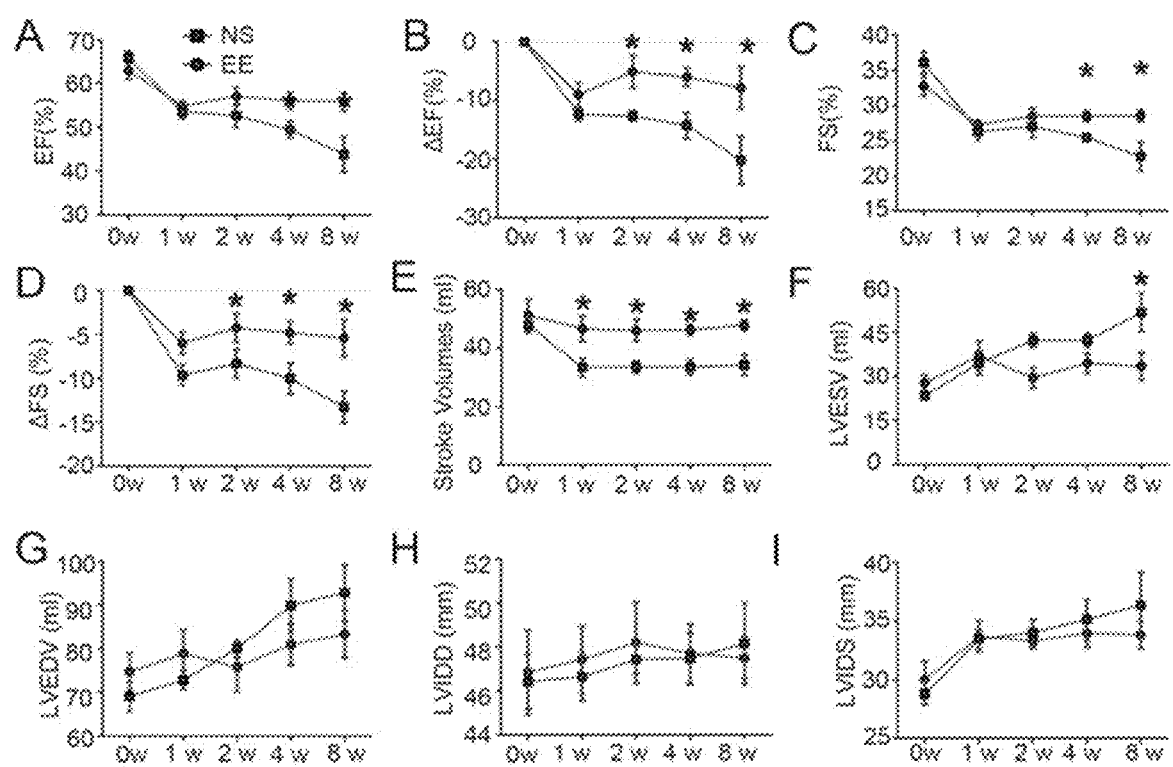
FIG. 20: EE improves cardiac function and reduces left ventricular remodeling in pigs with myocardial infarction.

FIG. 20 shows that chicken's EE treatment of large white pig with myocardial infarction can increase the left ventricular ejection fraction and fractional shortening of large white pigs with myocardial infarction. The heart function of the large white pig in the control group after the surgery shows a trend of gradual decline, while the left ventricular (heart) function of the EE treatment group shows an improvement (to a certain extent), and that EF and FS after 2 weeks, 4 weeks and 8 weeks of the surgery are significantly higher than those of the control group (FIGS. 20, A and C). To calculate the ΔEF and ΔFS by the difference of the preoperative basic value, it is found that EE treatment can significantly decrease the preoperative decrease value of EF and FS comparing to the value before the surgery. The decrease value of the treatment group is significantly lower than that of the control group after 2, 4, and 8 weeks (FIGS. 20, B and D). The stroke volume of the treatment group is significantly higher than that of the control group 1-8 weeks after surgery (FIGS. 20, E). The left ventricular end-systolic volume and diameter in the control shows an upward trend, and the treatment group is lower than the control group (FIGS. 20, F and I), indicating that EE increases the left ventricular contractility. The left ventricular end-diastolic volume and diameter of the control group shows an upward trend, while the EE treatment group first increases then decreases (FIGS. 20, G and H), indicating that EE reverses part of the ventricular remodeling caused by myocardial infarction.

After the large white pig ischemia-reperfusion (IR) model, the treatment group is given chicken EE immediately, and the control group is given 5% glucose. It is found during the observation and video monitoring that the large white pigs in the control group have less activity time and look tired. One week after surgery, it is statistically found that the daily activity time of large white pigs in the treatment group is significantly higher than that in the control group (FIG. 21, D). After 8 weeks of EE treatment, samples are taken and stained with triphenyltetrazolium chloride (TTC) after cardiac slice excision. It is found that myocardium from the apex of the heart to the anterior wall of the control group is thinner, demonstrates white after staining, and the left ventricle has light degree dilation; the myocardium from apex of the heart to the anterior wall of the left ventricle shows slight infarction, the ventricular wall isn't obviously thinned. Meanwhile, it is shown that the heart tissue of the control group has increased adipose tissue (FIG. 21, A), and it is statistically shown that the infarct area, as demonstrated white after TTC staining, of the treatment group is significantly lower than that of the control group (FIG. 21, B).

Figure 21:
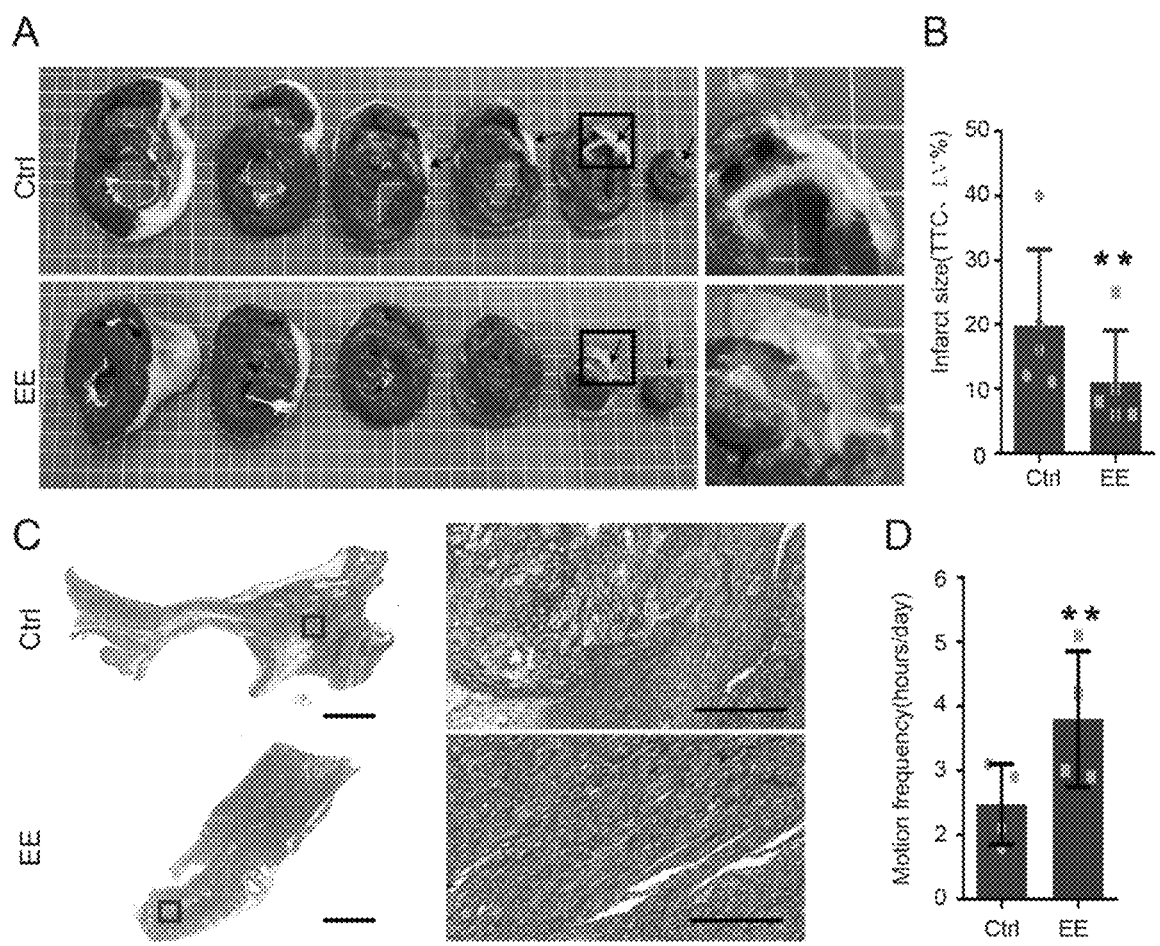
FIG. 21: EE reduces heart infarct size and helps extend duration of activity in IR pigs.

It is found that the control group shows transmural infarction and the ventricular wall becomes thinner after the Masson's trichrome staining of the left ventricular anterior wall tissue of the infarct area; the EE treatment group has cardiac fibrosis interspersed in the myocardial space, and the ventricular wall is not obviously thinned (FIG. 21, C).

The experimental results above indicate that EE can significantly increase the left ventricular ejection fraction and stroke volume of large white pig with ischemia-reperfusion, reduce left ventricular remodeling caused by myocardial infarction, reduce the pulmonary congestion of large white pig with ischemia-reperfusion, and improve daily activity time. In addition, the results of TTC staining demonstrate that the area of cardiac infarction in the EE treatment group is significantly lower than that in the control group; the results of stained tissue from Masson staining demonstrate that the anterior wall of the left ventricle of the large white pig in the control group has transmural infarction, and the area of fibrosis is significantly higher than that in the EE treatment group; The results of Fluorescence staining demonstrate that EE can increase the regeneration of blood vessel in the infarct area of the large white pig.

Example 14

Acquire the amniotic fluid of the mice with gestational age of 13-14 days according to the method described in Example 1. Using centrifuge tubes to collect the amniotic fluid extract, balance, and centrifuge it at 3500 rpm for 21 minutes in Zhongjia™ KDC-2046 low-speed refrigerated centrifuge at 5° C. (See the manual for the standard operating procedure of the centrifuge). Gently transfer the supernatant to a clean plastic storage tank, and store it in a refrigerator at −80° C. Reserve 5 ml samples for subsequent testing in each batch. All steps shall be performed under sterile conditions.

Cellular Activity Test: After digesting the well-grown AC16, spread it in a 96-well-plate, 8000 cells/well, and five replicate wells in each group. Incubate for 2 hours in a 5% $CO_2$ saturated humidity incubator at 37° C., and the cells adhere to the wall. After 24 hours of DMEM starvation incubation in the medium, replace to 10% FBS DMEM, DMEM and respectively add 2.5%, 5%, 10% and 20% (by volume) of mouse EE medium. After incubating for 24 hours, add 10 μl of CCK-8 reagent to each well. After incubating for 2 hours, measure the absorbance at 450 nm in an ELISA reader.

Figure 22:
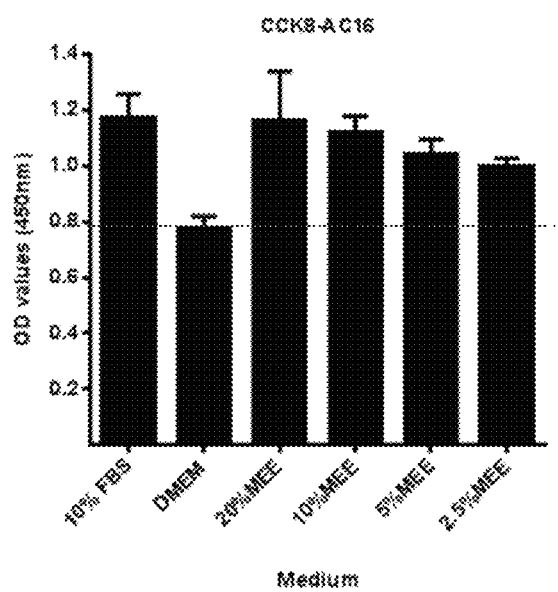
FIG. 22: Effect of amniotic fluid from mouse on the growth vitality of AC16 cells.

The result is shown in FIG. 22.

The invention claimed is:

1. A cell culture medium, wherein the cell culture medium contains an extract isolated from an amniotic fluid of a chicken egg at an embryo age of 5-12 days,
   wherein the extract is obtained by gel filtration column and anion exchange column and does not bind to an ion exchange column between pH 5.8 and 8.0, and molecular weight of components contained in the extract is in the range of 500-1200 Daltons.

2. The cell culture medium of claim 1, wherein the amniotic fluid is an amniotic fluid of a chicken egg at an embryo age of 6-11 days.

3. The cell culture medium of claim 2, wherein the amniotic fluid is an amniotic fluid of a chicken egg at an embryo age of 7-9 days.

4. The cell culture medium of claim 2, wherein the amniotic fluid is an amniotic fluid of a chicken egg at an embryo age of 7-8 days.

5. A cell culture method, wherein the method includes the steps of culturing cells in vitro using a cell medium containing an extract isolated from an amniotic fluid of a chicken egg at an embryo age of 5-12 days, wherein the extract is obtained by gel filtration column and anion exchange column and does not bind to an ion exchange column between pH 5.8 and 8.0, and molecular weight of components contained in the extract is in the range of 500-1200 Daltons.

6. The cell culture method of claim 5, wherein the cells are from any one or more of the following tissues: cartilage, meniscus, ligament, tendon tissue, intervertebral disc tissue and periodontal tissue, skin, blood vessels, muscle and fascia, periosteum, eye tissue, pericardium, lung tissue and synovial tissue and nerve tissue, kidney, bone marrow, urogenital, intestinal tissue, liver, pancreas, spleen tissue and adipose tissue.

7. The cell culture method of claim 5, wherein the amniotic fluid is an amniotic fluid of a chicken egg at an embryo age of 6-11 days.

8. The cell culture method of claim 7, wherein the amniotic fluid is an amniotic fluid of a chicken egg at an embryo age of 7-9 days.

9. The cell culture method of claim 7, wherein the amniotic fluid is derived from chicken eggs at an embryo age of 7-8 days.

10. A method for promoting cell growth and/or tissue repair, treating conditions related to tissue damage, or promoting wound healing, comprising administering a subject in need thereof a therapeutically effective amount of an extract of an amniotic fluid of a chicken egg at an embryo age of 5-12 days, wherein the extract is obtained by gel filtration column and anion exchange column and does not bind to an ion exchange column between pH 5.8 and 8.0, and molecular weight of components contained in the extract is in the range of 500-1200 Daltons.

11. The method of claim 10, wherein the amniotic fluid is an amniotic fluid of a chicken egg at an embryo age of 6-11 days.

12. The method of claim 11, wherein the amniotic fluid is an amniotic fluid of a chicken egg at an embryo age of 7-9 days.

13. The method of claim 11, wherein the amniotic fluid is an amniotic fluid of a chicken egg at an embryo age of 7-8 days.

14. The method of claim 11, wherein:
the tissue is from one or more of the following tissues: cartilage, meniscus, ligament, tendon tissue, intervertebral disc tissue and periodontal tissue, skin, blood vessels, muscle and fascia, periosteum, eye tissue, pericardium, lung tissue and synovial tissue and nerve tissue, kidney, bone marrow, urogenital, intestinal tissue, liver, pancreas, spleen tissue and adipose tissue; the animal cells are from any one or more of the tissues;
the condition related to tissue injury includes the condition caused by the disease or trauma or failure of tissue to develop normally, selecting from: hernia; Pelvic floor defect; laceration or fracture of tendon or ligament; skin wounds; vascular diseases; muscle diseases; and senile diseases.

15. The method of claim 14, wherein:
the skin wounds are selected from a group consisting of scars, traumatic wounds, ischemic wounds, diabetic wounds, severe burns, skin ulcers, venous and diabetic ulcers, surgical wounds associated with the removal of skin cancer;
the vascular diseases are selected from a group consisting of peripheral artery disease, abdominal aortic aneurysm, carotid artery disease and venous disease, vascular defects, vascular dysplasia;
the muscle diseases are selected from a group consisting of congenital myopathy, myasthenia gravis, inflammatory, neurological and myogenic muscle diseases, and muscular dystrophy;
the senile diseases are selected from the group consisting of Alzheimer's disease and senile joint degeneration.

16. The method of claim 15, wherein:
the skin ulcer is bedsore or pressure-induced ulcer;
the muscular dystrophy is selected from a group consisting of Duchenne muscular dystrophy, Becker muscular dystrophy, myotonic dystrophy, limb girdle muscular atrophy, facioscapulohumeral muscular dystrophy, congenital muscular dystrophy, ophthalmopharyngeal muscular atrophy, distal muscular dystrophy, and Emery-Dreifuss muscular dystrophy.

17. The method of claim 10, wherein the method is used for promoting regeneration of cardiac cells after myocardial infarction.

18. The method of claim 17, wherein the cardiac cells are cardiomyocytes.

* * * * *